United States Patent
Huerta-Ochoa

(10) Patent No.: US 8,205,465 B2
(45) Date of Patent: Jun. 26, 2012

(54) CONTROL SYSTEM FOR AN EXPANSION VALVE REGULATING REFRIGERANT TO AN EVAPORATOR OF A CLIMATE CONTROL SYSTEM

(75) Inventor: Ruben Huerta-Ochoa, O'Fallon, MO (US)

(73) Assignee: Emerson Electric Co., St. Louis, MO (US)

( * ) Notice: Subject to any disclaimer, the term of this patent is extended or adjusted under 35 U.S.C. 154(b) by 605 days.

(21) Appl. No.: 12/486,550

(22) Filed: Jun. 17, 2009

(65) Prior Publication Data

US 2010/0324742 A1 Dec. 23, 2010

(51) Int. Cl.
F25B 41/04 (2006.01)

(52) U.S. Cl. .......................................... 62/224; 62/225

(58) Field of Classification Search .............. 62/222, 62/224, 225, 210, 211, 223; 700/282
See application file for complete search history.

(56) References Cited

U.S. PATENT DOCUMENTS

| | | | |
|---|---|---|---|
| 1,751,591 A | 3/1930 | McCloskey | |
| 3,842,331 A | 10/1974 | Hendrickson et al. | |
| 3,987,819 A | 10/1976 | Scheuermann | 137/637.3 |
| 4,137,491 A | 1/1979 | Bartley et al. | |
| 4,327,758 A | 5/1982 | Uhlmann | 137/625.17 |
| 4,618,808 A | 10/1986 | Ish-Shalom et al. | |
| 4,970,423 A | 11/1990 | Tamae et al. | |
| 5,006,772 A | 4/1991 | Danby | |
| 5,227,709 A | 7/1993 | Gauthier et al. | |
| 5,316,263 A | 5/1994 | Mino | |
| 5,378,975 A | 1/1995 | Schweid et al. | |
| 5,691,613 A | 11/1997 | Gutwillinger | |
| 5,771,703 A * | 6/1998 | Rajendran | 62/204 |
| 5,783,939 A | 7/1998 | Lippmann et al. | |
| 6,619,613 B1 | 9/2003 | Akamatsu et al. | 251/129.04 |
| 6,667,595 B2 | 12/2003 | Wiseman | |
| 6,870,346 B2 | 3/2005 | Davidov | |
| 7,093,818 B2 | 8/2006 | Koeneman | 251/208 |
| 7,116,070 B2 | 10/2006 | MacKay | |
| 7,168,677 B2 | 1/2007 | Gama et al. | 251/69 |
| 7,316,384 B2 | 1/2008 | Sekiya et al. | 251/129.11 |
| 2007/0175229 A1* | 8/2007 | Redlich | 62/225 |
| 2008/0216500 A1* | 9/2008 | Chen et al. | 62/225 |

* cited by examiner

Primary Examiner — Chen Wen Jiang
(74) Attorney, Agent, or Firm — Harness, Dickey & Pierce, P.L.C.

(57) ABSTRACT

A control system for an expansion valve and evaporator of an air conditioner system is provided that comprises an expansion valve having a valve element that is movable relative to a valve port for varying an opening area to regulate the flow of refrigerant to an evaporator coil. The evaporator coil has an inlet and an outlet, and is configured to conduct heat to a refrigerant flowing through the evaporator coil, where the exiting refrigerant temperature is dependent on the refrigerant flow rate. The control system for controlling the expansion valve includes an evaporator coil outlet temperature sensor, which is configured to sense the temperature of refrigerant within the evaporator coil near the outlet of the evaporator coil. A controller is in communication with the evaporator coil outlet temperature sensor for sensing temperature of refrigerant near the evaporator outlet, and is configured to determine a control set point based on the refrigerant temperature near the evaporator outlet. The control set point is used to determine a valve opening area to regulate refrigerant flow into the evaporator such that temperature of refrigerant at the evaporator outlet is within a temperature band having a lower bound within 12 degrees Fahrenheit above the liquid-to-vapor transition temperature.

20 Claims, 20 Drawing Sheets (b) Phase plane response (a) Step response

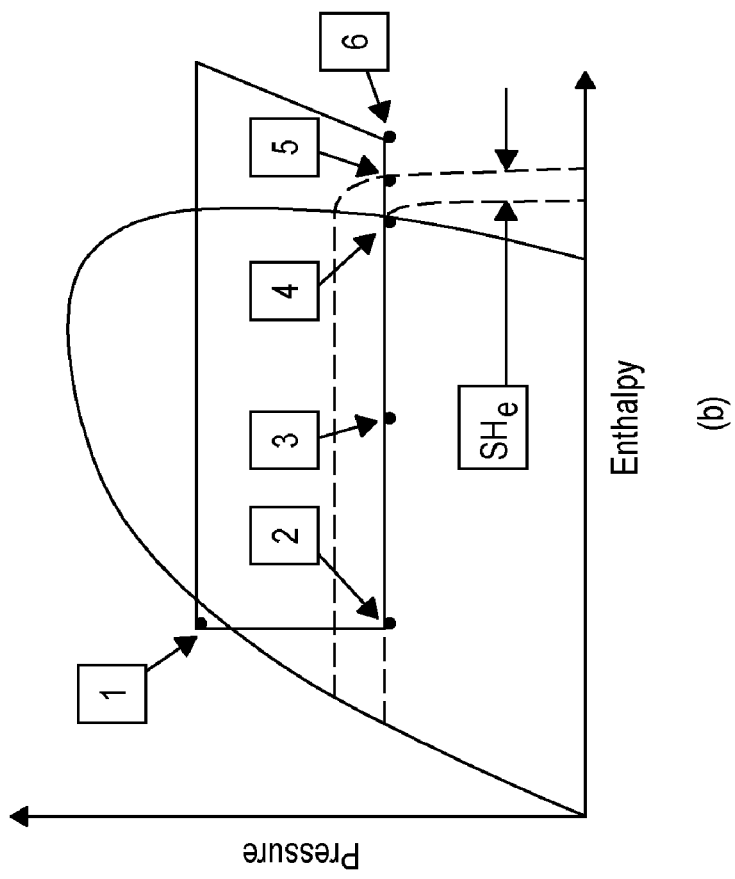
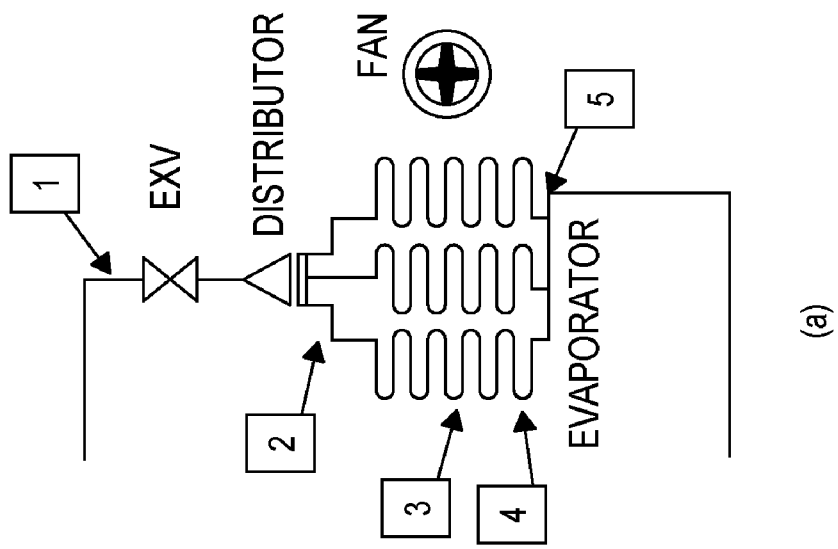
Fig. 18

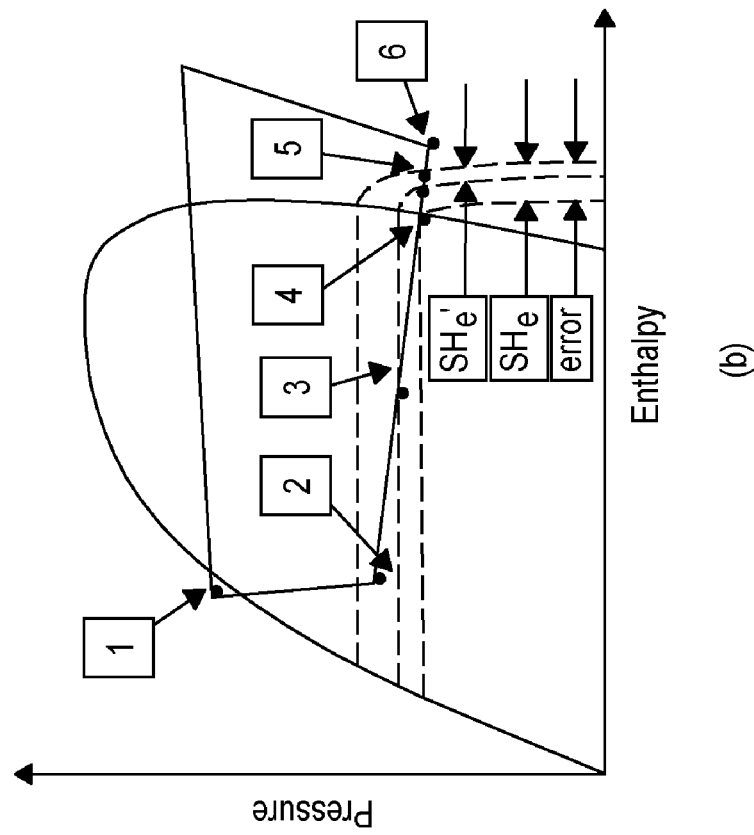
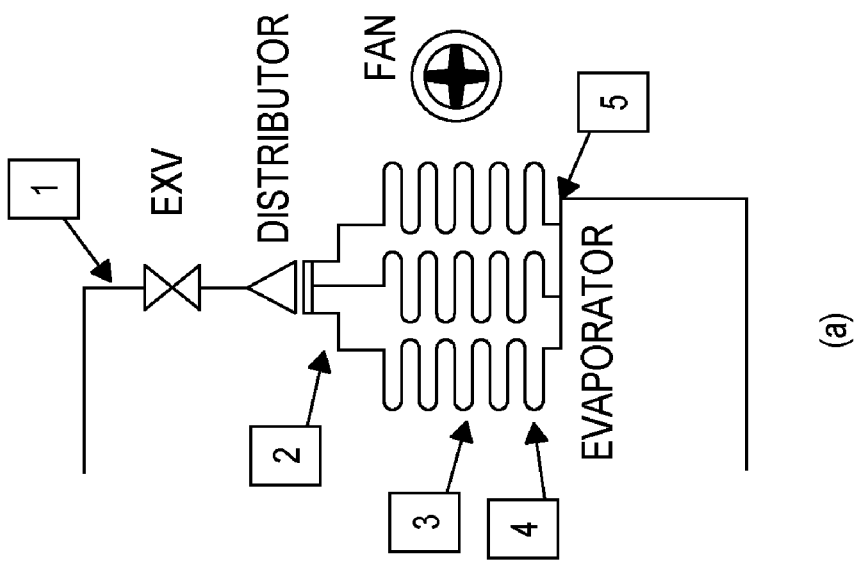
Fig. 19

CONTROL SYSTEM FOR AN EXPANSION VALVE REGULATING REFRIGERANT TO AN EVAPORATOR OF A CLIMATE CONTROL SYSTEM

FIELD OF THE INVENTION

The present disclosure relates to flow control valves, and more particularly to motor actuated modulating flow control valves.

BACKGROUND

The statements in this section merely provide background information related to the present disclosure and may not constitute prior art.

In a conventional refrigeration or HVAC system, flow control devices are typically utilized to control the flow of working fluids in a refrigeration system. In general, the refrigeration system would include a compressor that forces the particular refrigerant used in the system through a condensing coil, where the refrigerant vapor liquefies. The liquid refrigerant passes through a thermostatic expansion valve, expanding the high pressure liquid refrigerant to a low pressure vapor. The low pressure, low temperature refrigerant discharged from the thermostatic expansion valve is then directed through an evaporator coil for absorbing heat and thus refrigerating the space inside the container surrounding the evaporator coil.

The thermostatic expansion valve functions to meter the flow of refrigerant into the evaporator coil in proportion to the rate of evaporation of the refrigerant in the evaporator coil, and is responsive to the temperature and pressure of the refrigerant leaving the evaporator coil. In this manner, the thermostatic expansion valve is intended to control flow so that the refrigerant leaves the evaporator coil at a predetermined superheat. Generally, the superheat of the refrigerant is a measure of the heat contained in the refrigerant vapor above its heat content at the boiling point (saturated vapor temperature) at the exiting pressure. Maintaining the refrigerant entering the suction line from the evaporator coil at a desired superheat level enhances the refrigeration system performance.

Thermal expansion valves are typically used, in conjunction with a suction regulator, to maintain a consistent evaporator coil pressure. In known systems, conventionally designed mechanical pressure regulators are used for this purpose. Conventional mechanical pressure regulators include a throttling element that, when moved, limits the flow of the refrigerant through the suction regulator to regulate the pressure. A diaphragm, or other sensing element, responds to variations in the inlet pressure and moves the throttling element accordingly. A reference pressure, typically exerted by a spring, is applied to one side of the diaphragm to bias the diaphragm in a desired position, or set point. High side inlet pressure is applied to the other side of the diaphragm to move the diaphragm against the spring, and thus, move the throttling element.

In many refrigeration system implementations, finer temperature control is desirable. Adjusting the setting of conventionally designed mechanical pressure regulators in such thermal expansion valves can be a time consuming, manual process. Moreover, if the refrigerant or desired temperature changes, the complicated process of manually adjusting the pressure regulators set screw must be repeated.

SUMMARY

This section provides a general summary of the disclosure, and is not a comprehensive disclosure of its full scope or all of its features.

The present disclosure relates to various embodiments of a control system for controlling an expansion valve to regulate the flow of refrigerant to an evaporator coil of an air conditioner. In the various embodiments, the control system controls an expansion valve that regulates refrigerant flow to an evaporator coil of the air conditioning system. The expansion valve has a valve element that is movable relative to a valve port for varying an opening area of the valve port to regulate the flow of refrigerant through the valve and to the evaporator coil. The evaporator coil has an inlet and an outlet, and is configured to conduct heat to a refrigerant flowing through the evaporator coil. In conducting heat to the refrigerant, the temperature of the refrigerant exiting the evaporator coil outlet is dependent on the flow rate of the refrigerant to the evaporator coil, since flow rate effects the duration of time that heat is conducted to the refrigerant. The control system for controlling the expansion valve includes an evaporator coil outlet temperature sensor, which is configured to sense the temperature of refrigerant within the evaporator coil near the outlet of the evaporator coil. The control system further includes a controller in communication with the evaporator coil outlet temperature sensor. The controller is configured to determine a control set point based on the sensed temperature of refrigerant near the outlet of the evaporator coil. The control set point is used to determine a valve opening area sufficient to regulate the flow rate of refrigerant into the evaporator coil, such that the temperature of the refrigerant at the outlet of the evaporator coil is within a temperature band having a lower bound that is within 12 degrees Fahrenheit above the liquid-to-vapor transition temperature of the refrigerant.

In one aspect of the present disclosure, one embodiment of a controller for an expansion valve is provided. The controller is in communication with an outlet temperature sensor that is configured to sense the temperature of refrigerant near the evaporator coil outlet, where the temperature of the refrigerant at the evaporator coil outlet is dependent on the flow rate of refrigerant to the evaporator coil. The controller is also in communication with an expansion valve, and is configured to provide an output of a control variable to the expansion valve for adjusting the opening area in the expansion valve. The controller is configured to determine an initial control set point based on the temperature sensed by the evaporator coil outlet temperature sensor, which initial control set point is used to determine a first valve opening area sufficient to regulate the flow rate of refrigerant such that the temperature sensed by the outlet temperature sensor (e.g., the temperature of refrigerant at the outlet of the evaporator) is within a temperature band having a lower bound that is within 12 degrees Fahrenheit above the liquid-to-vapor transition temperature of the refrigerant. The controller is further configured to determine a control variable for establishing the initial opening area that corresponds to the determined optimum control set point, and to output the control variable to the expansion valve to thereby establish the initial flow rate of refrigerant through the expansion valve. The controller is further configured to detect the temperature sensed by the evaporator coil outlet temperature sensor over time, to thereby capture oscillations in the sensed temperature of the refrigerant which define a minimum sensed temperature and a maximum sensed temperature of the refrigerant at the evaporator coil outlet, and an amplitude "A" of the temperature oscillation. The controller is further configured to determine an optimum control set point, based on a difference between the liquid-to-vapor transition temperature and said minimum sensed temperature of the refrigerant, or based on a duration of time in which the oscillating temperature of the refrigerant at the outlet of the evaporator coil falls to the liquid-to-vapor transition temperature of the refrigerant.

In yet another aspect of the present disclosure, one embodiment of a method is provided for controlling an opening area in an expansion valve to regulate a flow rate of refrigerant therethrough to an evaporator coil. The method comprises opening the expansion valve to establish refrigerant flow, and detecting a temperature sensed by an evaporator coil outlet temperature sensor, which is used in determining an initial control set point. The method includes determining a first valve opening area sufficient to regulate the flow rate of refrigerant such that the temperature of the refrigerant at the evaporator outlet is within a temperature band having a lower bound that is within 12 degrees Fahrenheit of the liquid-to-vapor transition temperature of the refrigerant. The method further includes detecting the temperature sensed by the outlet temperature sensor over time to capture oscillations defining a minimum and maximum sensed temperature, and an amplitude "A" of the temperature oscillation. By determining a difference between the liquid-to-vapor transition temperature and minimum sensed temperature, and a duration of time in which the oscillating temperature of refrigerant at the evaporator outlet falls to the liquid-to-vapor transition temperature (if any) the method may determine an optimum set point. The method determines an optimum control set point based on the difference between the liquid-to-vapor transition temperature and the minimum sensed temperature, or on the duration of time in which the oscillating temperature of the refrigerant at the evaporator outlet falls to the liquid-to-vapor transition temperature. The method proceeds to determine an optimum valve opening area for establishing a flow rate of refrigerant that maintains the oscillating temperature of the refrigerant at an optimum level in which the minimum sensed temperature of the refrigerant at the evaporator coil outlet is within a fraction of the oscillation amplitude "A" from the liquid-to-vapor transition temperature, and the oscillating temperature of the refrigerant at the evaporator coil outlet does not fall to the liquid-to-vapor transition temperature for more than a time duration of one quarter of the period of the temperature oscillation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure in any way.

FIG. 18 is a graph of a P-H curve associated with a conventional air conditioning system in which the pressure drop across the evaporator is assumed to be zero;

FIG. 19 is a graph of a P-H curve associated with a conventional air conditioning systems in which the evaporator actually exhibits significant pressure drop that can cause control performance problems;

Corresponding reference numerals indicate corresponding parts throughout the several views of the drawings.

DETAILED DESCRIPTION

In the following description, numerous specific details are set forth such as examples of specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication and manufacture for those of ordinary skill.

According to various aspects of the present disclosure, exemplary embodiments are provided of a control system for an expansion valve that regulates refrigerant flow to an evaporator coil of an air conditioning system. In the various exemplary embodiments, the control system controls an expansion valve that regulates refrigerant flow to an evaporator coil of the air conditioning system. The expansion valve has a valve element that is movable relative to a valve port for varying an opening area of the valve port to regulate the flow of refrigerant through the valve and to the evaporator coil. The evaporator coil has an inlet and an outlet, and is configured to conduct heat to a refrigerant flowing through the evaporator coil. In conducting heat to the refrigerant, the temperature of the refrigerant exiting the evaporator coil outlet is dependent on the flow rate of the refrigerant to the evaporator coil, since flow rate effects the duration of time that heat is conducted to the refrigerant. The control system for controlling the expansion valve includes an evaporator coil outlet temperature sensor, which is configured to sense the temperature of refrigerant within the evaporator coil near the outlet of the evaporator coil. The control system further includes a controller in communication with the evaporator coil outlet temperature sensor. The controller is configured to determine a control set point based the sensed temperature of refrigerant. The control set point is used to determine a valve opening area sufficient to regulate the flow rate of refrigerant into the evaporator coil, such that the temperature of the refrigerant at the outlet of the evaporator coil is within a temperature band having a lower bound that is within 12 degrees Fahrenheit above the liquid-to-vapor transition temperature of the refrigerant.

Figure 1:
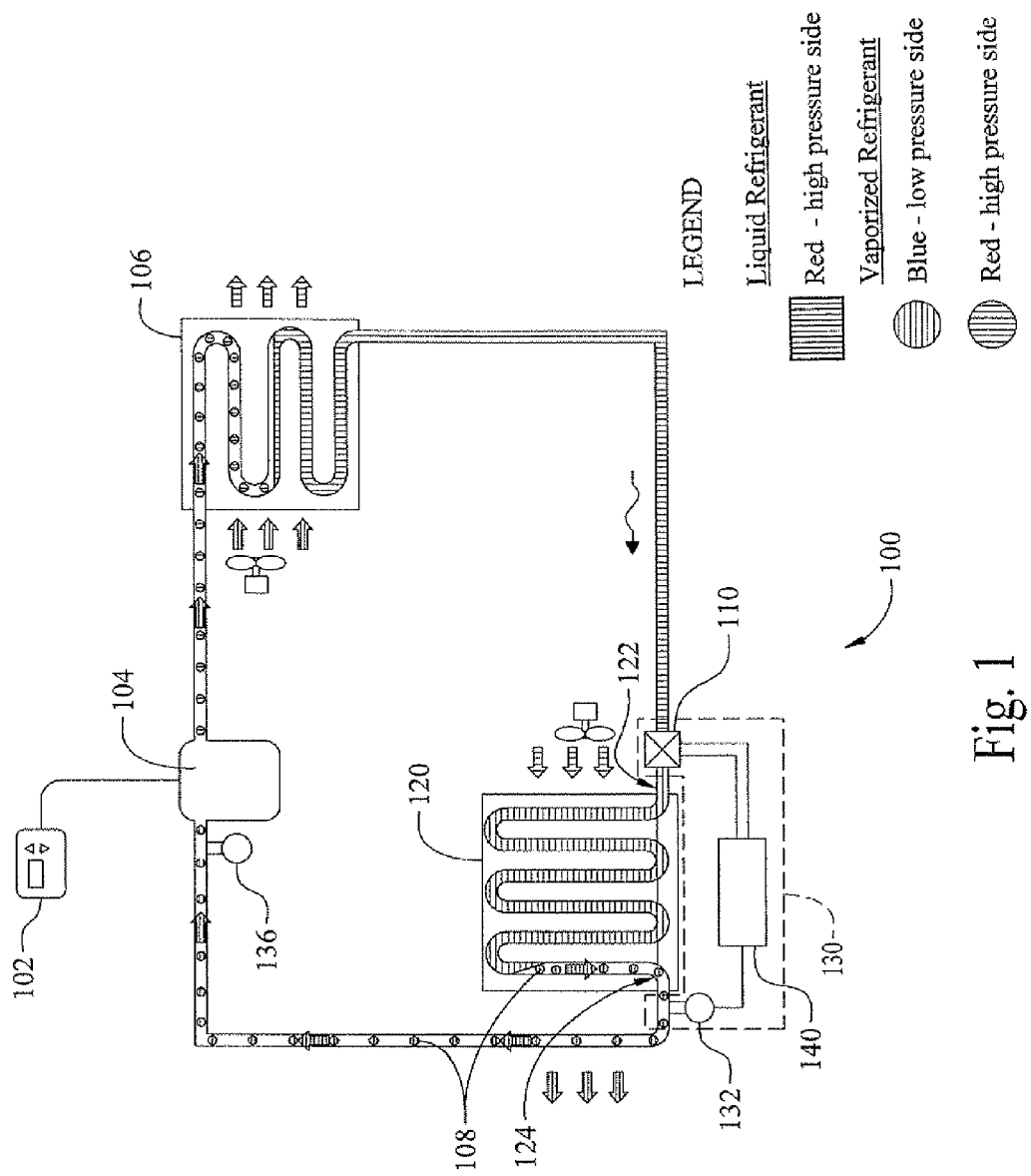
FIG. 1 is an illustration of one embodiment of a control system for controlling an expansion valve to regulate refrigerant to an evaporator in an air conditioning system, in accordance with the principles of the present disclosure.

Referring to FIG. 1, a first embodiment is shown of a control system 130 for controlling an expansion valve 110 and an evaporator coil 120 of an air conditioning system 100. The first embodiment of a control system 130 is configured to control an expansion valve 110 that regulates flow of refrigerant 108 to an evaporator coil 120 having an inlet 122 and an outlet 124. The evaporator coil 120 is configured to conduct heat to a refrigerant 108 flowing through the evaporator coil 120, wherein the temperature of the refrigerant 108 exiting an evaporator coil outlet 124 is dependent on the flow rate of the refrigerant 108 to the evaporator coil 120 (which is representative of the flow rate through the evaporator coil). The control of refrigerant flow rate and the state of the refrigerant 108 exiting the evaporator coil outlet 124 is explained in more detail below.

As shown in FIG. 1, the first embodiment of a control system controls an expansion valve 110 of an air conditioning system 100, and an aspect of the air conditioning system's refrigeration cycle. A refrigeration cycle uses a suitable refrigerant compound that is formulated to change phase from liquid to gas and vice versa, at suitable temperatures and pressures for a particular application. The refrigeration cycle starts when a thermostat 102 activates the system compressor 104, where refrigerant 108 at the compressor 104 input is a cool, low pressure gas. The compressor 104 physically compresses the refrigerant 108 to a hot, high pressure gas, which then enters a condenser coil 106 where the refrigerant 108 changes phase from a hot, high pressure gas to a hot, high pressure liquid. The heat from the hot, high pressure liquid is transferred from the condenser coil 106 to its surroundings (e.g., the outside air or ground). In conventional air conditioning systems, the high pressure liquid refrigerant emerging from the condenser coil is then passed through an expansion valve 110, and exits as a cold, low pressure liquid into an evaporator coil where it changes phase to a cold, low pressure gas. As the cool refrigerant 108 flowing through the evaporator coil 120 absorbs heat from the indoor air in the occupied space (e.g., the space being cooled), the temperature of the refrigerant gradually increases. This addition of heat causes the refrigerant 108 to approach boiling point at which the refrigerant 108 turns into a vapor. In the first embodiment, the refrigerant 108 passes through a variable expansion valve 110 that is controlled by the control system 130 to regulate the rate of refrigerant flow, and thereby control where the refrigerant changes phase to a gas or vapor within the evaporator coil 120. This is contrary to conventional air conditioning systems in which refrigerant is passed through a fixed nozzle, metering device, or fixed orifice expansion valve, as explained below.

Figure 2:
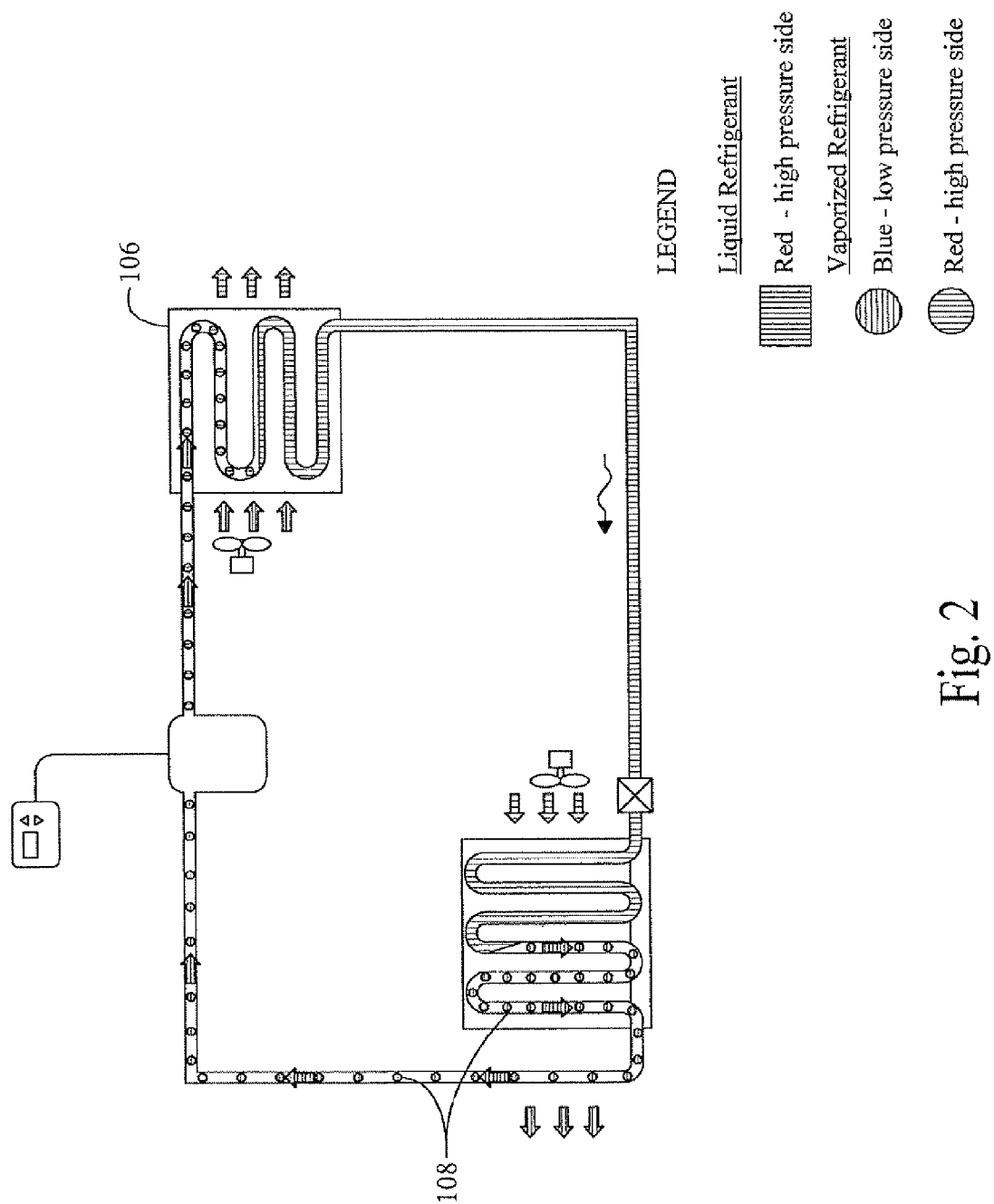
FIG. 2 is an illustration of a conventional air conditioning system.

In a conventional air conditioning system, the refrigerant will be 100 percent vapor at some point within the evaporator coil, as shown in FIG. 2. This is because conventional air conditioning systems typically have an expansion valve with a fixed orifice setting that is configured to provide less than a full flow capacity that the evaporator is rated or designed for, which causes the lower mass flow of refrigerant to transition between a liquid and a vapor at an intermediate point between the evaporator inlet and the evaporator outlet. The evaporator coil in FIG. 2 provides a large amount of surface area through which to conduct and transfer heat into the refrigerant within the coil. The refrigerant entering the evaporator coil is in a liquid state, and has a high heat absorbing capacity to permit efficient heat transfer through the surface area of the inlet portion of the evaporator coil. Once the refrigerant transitions to the vapor state, it is still cooler than the warm indoor air passing over the evaporator coil and may continue to absorb heat as it flows towards the evaporator outlet. However, once the refrigerant is in a vapor state, it has much less heat absorbing capacity than the denser liquid refrigerant that is entering the evaporator. Thus, the fixed orifice setting reduces the amount of the evaporator surface area that is utilized for effective heat transfer (reducing the evaporator coil evaporators efficiency), for the critical purpose of ensuring that 100 percent of the refrigerant exiting the evaporator and entering the compressor is in vapor state, to prevent compressor damage (condition of liquid entering compressor known as slugging). This means that the latter half of the evaporator coil's surface area is not effectively being utilized, since the refrigerant has transitioned to the vapor state. (See FIG. 2). Thus, conventional air conditioning systems provide a fixed orifice/flow setting that causes the refrigerant to transition from a liquid to a vapor at an intermediate point within the evaporator coil, to ensure that all refrigerant exiting the evaporator and entering the compressor is in vapor state (to prevent "slugging" or compressor damage). Conventional air conditioning systems also provide a fixed orifice/flow setting to provide a high degree of superheat to avoid system instability, as explained below.

Figure 3:
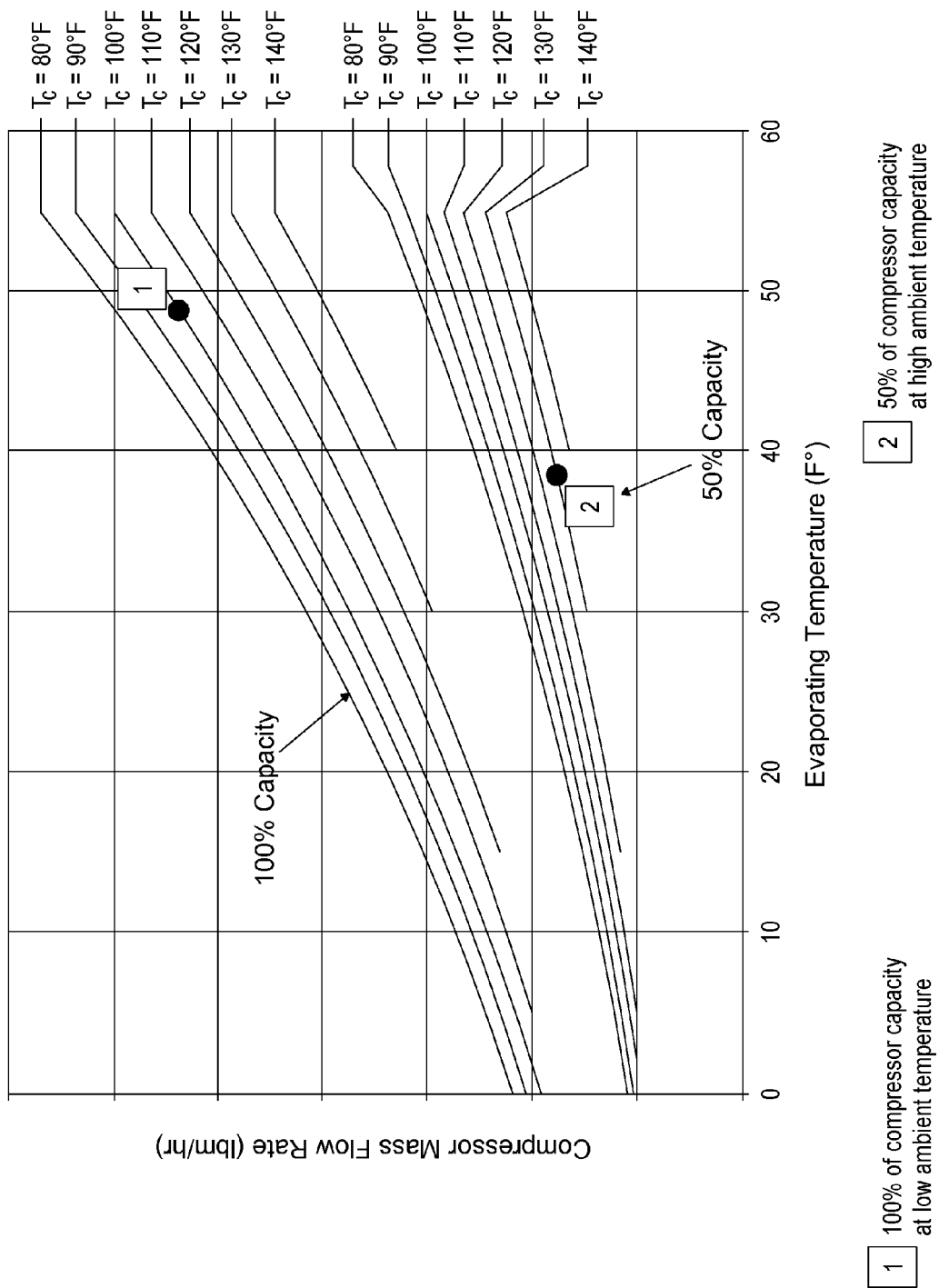
FIG. 3 is a graph illustrating the evaporating temperature of refrigerant relative to compressor capacity.
Figure 4:
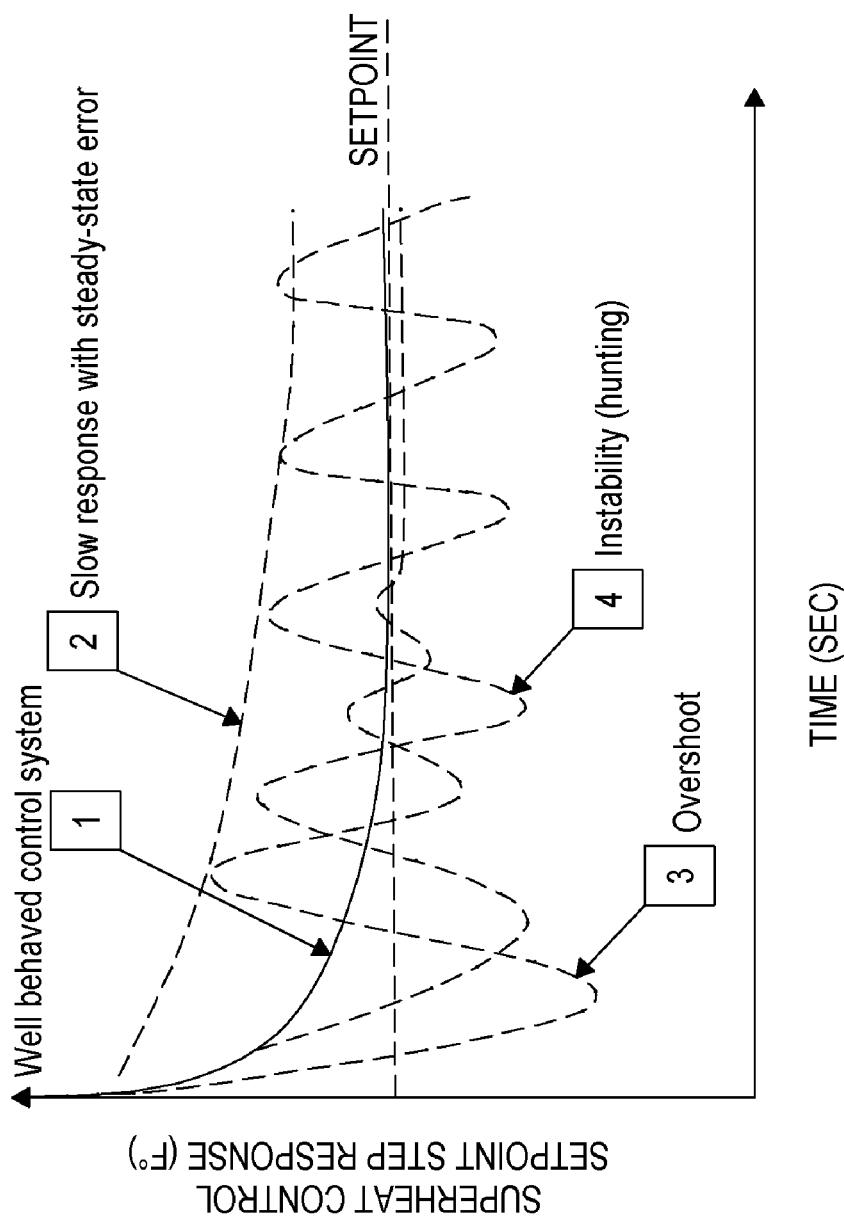
FIG. 4 is a graph of refrigerant temperature approaching a superheat control set point temperature.
Figure 5B:
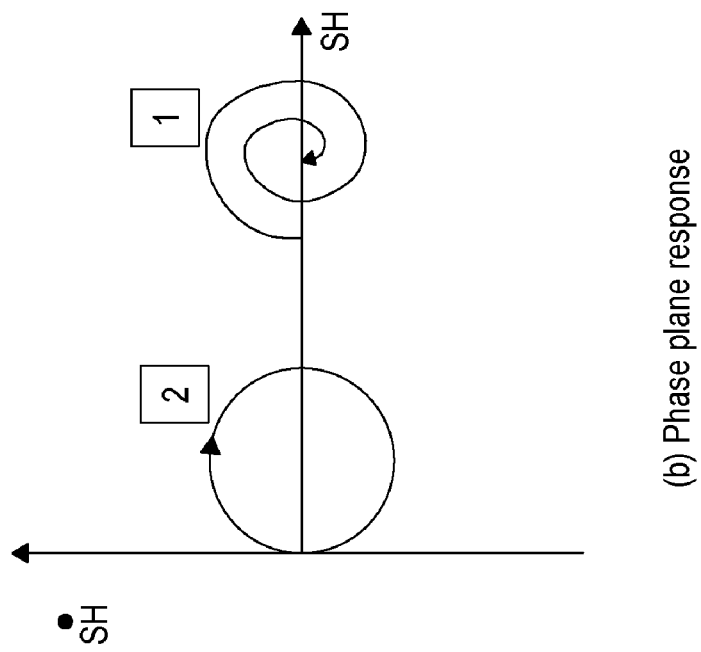
FIG. 5A-5B are graphs illustrating the difference between a high superheat setting with stability and a low superheat setting with inherent temperature oscillations and instability.
Figure 5A:
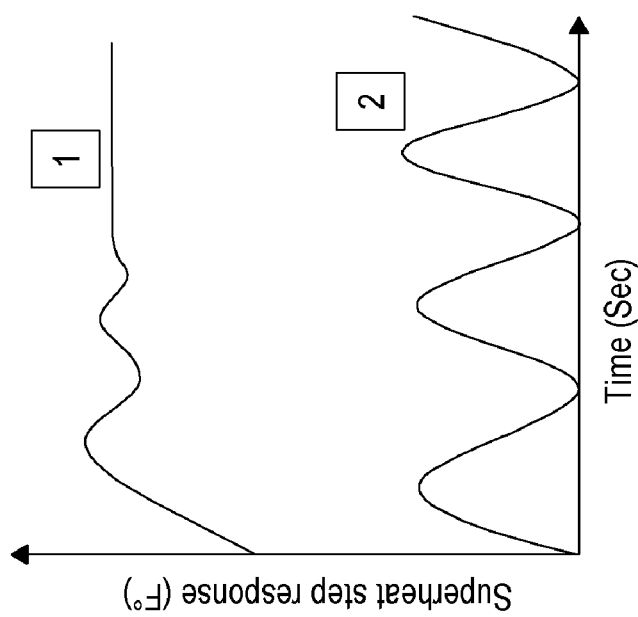

The refrigerant in the vapor state near the exit of the evaporator is known as "superheated", where the amount of superheat is the difference between the evaporator saturation temperature (refrigerant temperature at evaporator inlet) and the evaporator outlet temperature (refrigerant temperature at evaporator outlet). In conventional air conditioning systems, the refrigerant transitions from liquid-to-vapor at an intermediate point in the evaporator, which causes the superheat to be generally high (on the order of 12-17° Fahrenheit, which is typically above a "minimum stable superheat" point). The amount of superheat may also vary due to operating conditions. For example, when a compressor is operated at both full capacity and less than full capacity (e.g., 50% capacity), the varying evaporating temperatures at different capacities as shown in FIG. 3 can further affect the amount of superheat. Pursuing a lower superheat (attained by an increase in mass flow of refrigerant for absorbing conducted heat) would result in inherent oscillations in the temperature of the refrigerant near the evaporator coil outlet, which can affect stability and cause the system to "hunt" for an appropriate refrigerant flow rate, as shown in FIG. 4. This is also another reason why conventional air conditioning systems provide a fixed orifice/flow setting that causes the liquid refrigerant to transition to a vapor at an intermediate point in the evaporator coil, because this maintains the refrigerant above a "minimum stable superheat" point where temperature oscillation is minimal to avoid inherent oscillations in the temperature of the refrigerant in the evaporator that can affect stability and cause the system to "hunt" for a refrigerant flow rate. This is shown in FIG. 5A-5B, where operation of air conditioning refrigeration cycles at a less efficient high superheat set point "1" leads to stability in temperature, while operation at a more efficient low superheat set point "2" (leads to temperature oscillation and dynamic instability. As shown in FIG. 5B, a high superheat refrigerant flow setting "1" will converge on a stable superheat value, while a low superheat refrigerant flow setting "2" will result in instability. Thus, one skilled in the art would be led away from the low superheat high refrigerant flow setting "2" shown in 5B that results in instability, and would be led to trade off efficiency for stability by establishing refrigerant flow that will maintain the refrigerant above a "minimum stable superheat" point to avoid "hunting" and the risk of liquid refrigerant "slugging" the compressor.

Figure 7A:
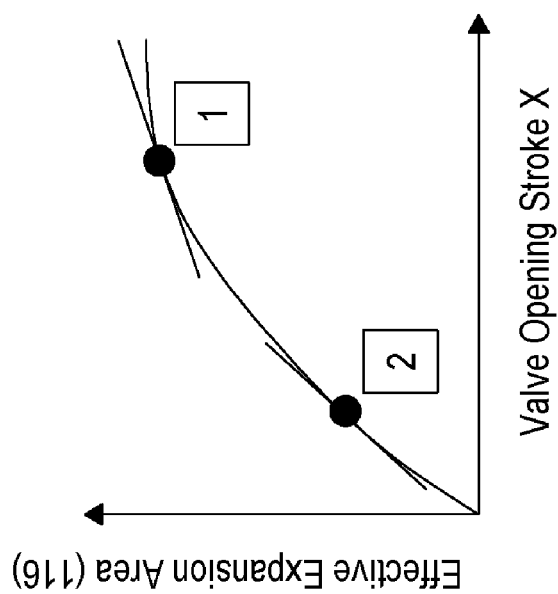
FIG. 7A-7B are graphs illustrating flow characteristics of flow through the expansion valve in FIG. 6, and its parabolic flow characteristics.
Figure 6:
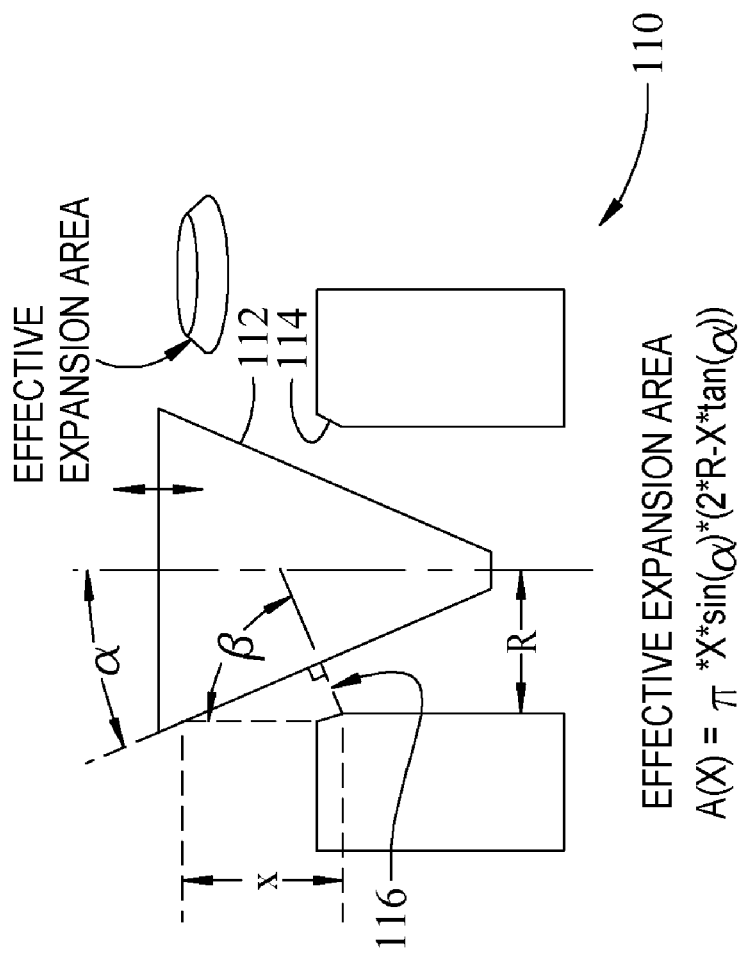
FIG. 6 is a cross-sectional view of an expansion valve of the first embodiment having a movable valve element, according to the principles of the present application.
Figure 7B:
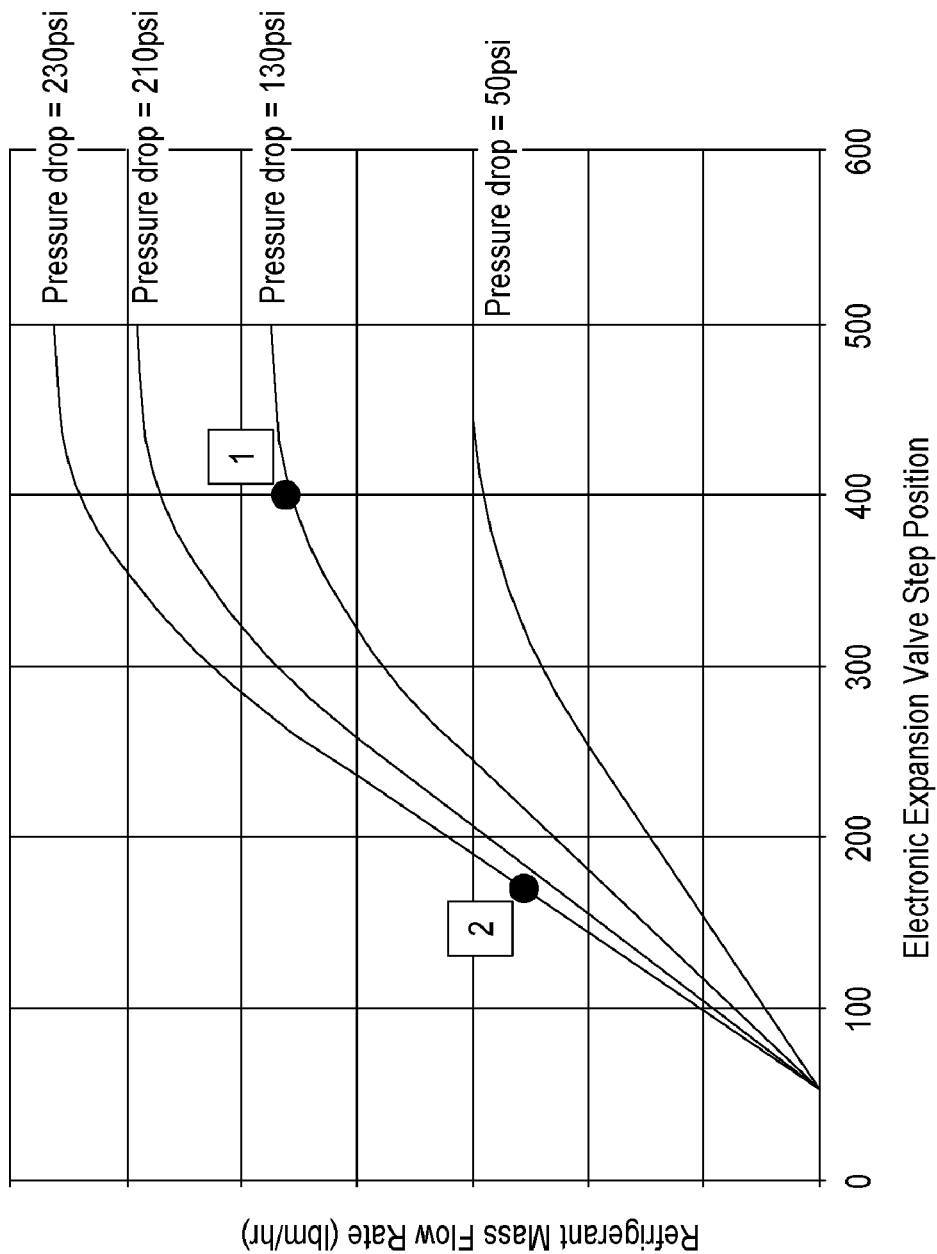

Unlike the fixed orifice/flow settings in conventional air conditioning systems (as shown in FIG. 2), the control system 130 in FIG. 1 controls an expansion valve 110 having a valve element 112 that is movable relative to a valve port 114, as shown in FIG. 6. The valve element 112 is movable for varying an opening area 116 of the valve port 114 to regulate the flow of refrigerant through the expansion valve 110 and to the evaporator coil 120 shown in FIG. 1. The opening area 116 (or expansion area) increases with valve element stroke "X" as shown in FIG. 7A. The flow characteristic of the valve opening in FIG. 6 is parabolic due to geometric properties of the valve element 112, where the effective opening area 116 or expansion area is a parabolic function of the stroke of the valve element 112. In the graph of valve opening area shown in FIG. 7A-7B, a large opening area "1" results in a small gradient (slope) in flow, leading to a small refrigeration system gain, and a small opening area "2" results in a large gradient (slope) in flow, leading to a large system gain (as shown in FIG. 7A-7B).

Figure 8:
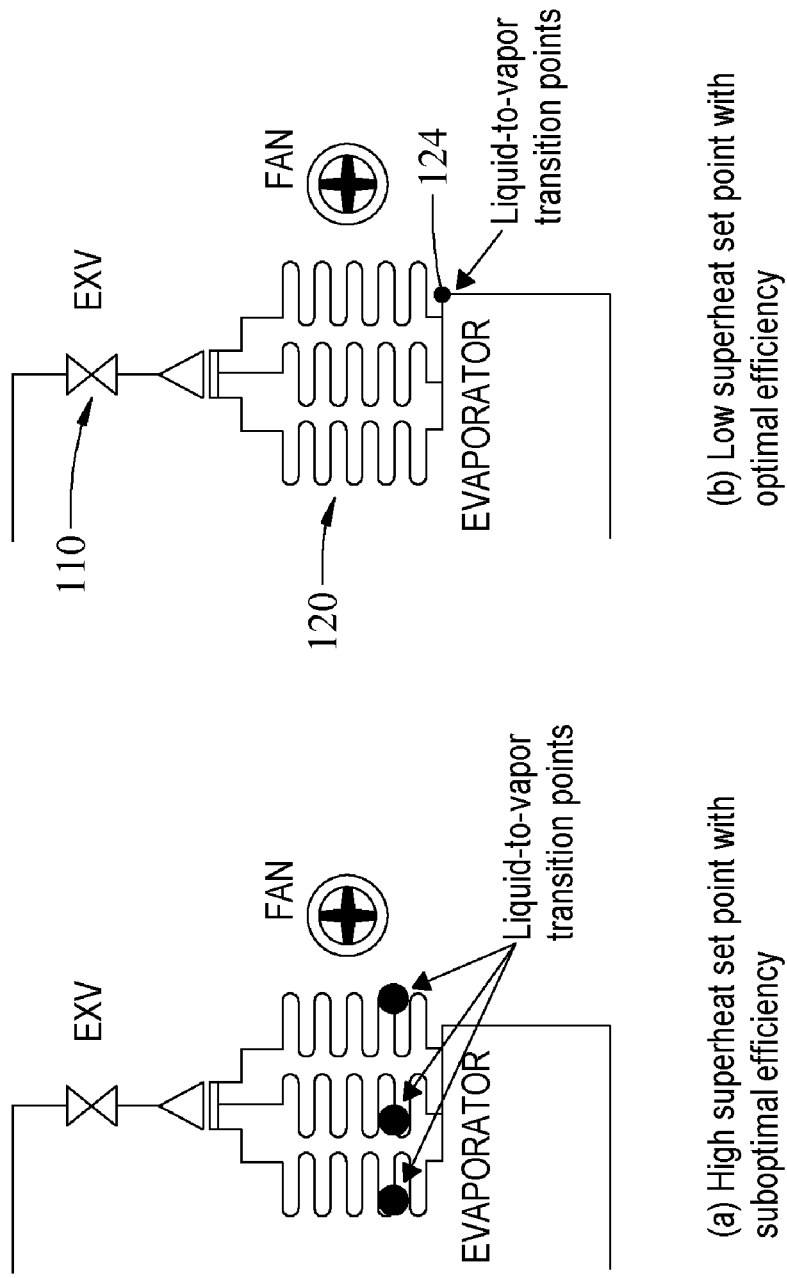
FIG. 8 is a diagram of an evaporator coil in the first embodiment, and the point at which the refrigerant within the evaporator transitions from liquid to vapor.

Referring back to FIG. 1, the control system 130 further includes an evaporator coil outlet temperature sensor 132 configured to sense the temperature of refrigerant 108 within the evaporator coil 120 near the evaporator coil outlet 124 of the evaporator coil 120, and a controller 140 in communication with the evaporator coil outlet temperature sensor 132. The controller 140 is configured to establish a flow rate of refrigerant 108 such that the point at which the refrigerant 108 within the evaporator coil 120 transitions from liquid to vapor is substantially at the evaporator coil outlet 124, as shown in FIG. 8 (contrary to the conventional air conditioning system shown in FIG. 2). FIGS. 9-12 illustrate how the controller 140 establishes such a flow rate, as explained below.

Figure 9:
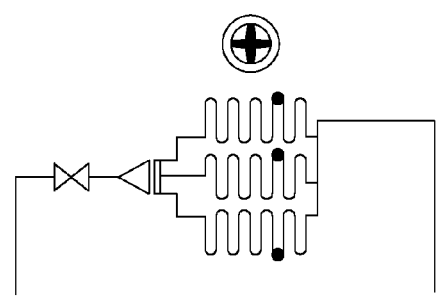
FIG. 9 is an illustration of the flow of refrigerant upon opening the expansion valve in the first embodiment.
Figure 10:
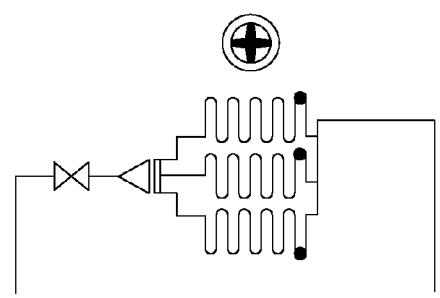
FIG. 10 is an illustration of the flow of refrigerant in the first embodiment after establishing an initial control set point, in accordance with the present disclosure.

When the thermostat 102 in FIG. 1 signals a call for air conditioning to turn on the compressor 104, the expansion valve 110 opens to establish refrigerant flow, as shown in FIG. 9 (the flow rate of which stabilizes after an initial period). After stabilization occurs, the controller 140 in FIG. 1 determines a control set point, based on the temperature sensed by outlet temperature sensor 132 or the temperature of the refrigerant within the evaporator coil (as sensed by a sensor at an intermediate point on the evaporator coil). The control set point to be determined and established may be, for example, a desired difference between the temperature of the refrigerant 108 entering the suction line 136 to the compressor 104 (where the refrigerant temperature is more stable) and the temperature of refrigerant within the evaporator coil 120 (as sensed by a sensor at the inlet or intermediate point of the evaporator, for example). The control set point determined by the controller 140 based on the temperature sensed by the evaporator coil outlet temperature sensor 132 is determined, calculated or adjusted based on the temperature sensed by outlet temperature sensor 132, to provide an initial control set point. The initial control set point is used to determine an initial opening area 116 in the valve 110 (shown in FIG. 6) that is sufficient to regulate the flow rate of refrigerant 108 such that the temperature of the refrigerant 108 at the evaporator coil outlet 124 is within a temperature band 152 having a lower bound 154 that is within 12 degrees Fahrenheit above the liquid-to-vapor transition temperature of the refrigerant, as shown in FIG. 10 (this would be below the "minimum stable superheat" point). The controller 140 may determine the valve's opening area 116 (shown in FIG. 6) using a look-up table, for example, that is stored in the controller 140. The controller 140 may be configured to select from the look-up table a particular control variable (such as a number of motor steps or current value) that when applied to the evaporator coil establishes a particular valve opening area corresponding to the determined control set point. The controller 140 in FIG. 1 applies the control variable to the expansion valve 110, to establish the particular valve opening area to establish a desired flow rate of refrigerant through the expansion valve 110. Accordingly, the controller 140 is configured to detect the refrigerant temperature sensed by the outlet temperature sensor 132, and to control the temperature of refrigerant 108 at the evaporator coil outlet 124 by determining an initial control set point that is used to control the valve's opening area 116 (shown in FIG. 6) for regulating the flow rate of refrigerant 108 through the expansion valve 110 and to the evaporator coil 120.

Figure 11:
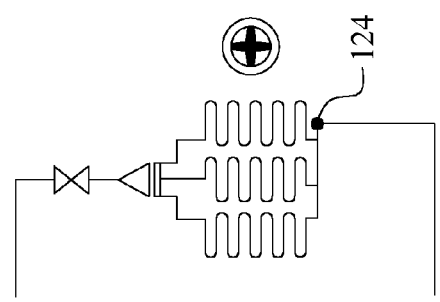
FIG. 11 is an illustration of the flow of refrigerant in the first embodiment after establishing an initial control set point.

The controller 140 in FIG. 1 is further configured to establish an optimum flow rate of refrigerant 108 such that the liquid-to-vapor transition point of the refrigerant 108 flowing through the evaporator coil 120 is near to the evaporator coil outlet 124, as shown in FIG. 11. It should be noted that the refrigerant may remain at a constant temperature while changing from a liquid to a vapor, or where a mix of refrigerants is used, the refrigerants may begin to vaporize at a first temperature and completely vaporize at a second higher temperature (called refrigerant glide). The controller 140 in FIG. 1 achieves a liquid-to-vapor transition point substantially at the evaporator coil outlet 124 by establishing an optimum flow rate of refrigerant through the expansion valve 110 that will maintain the temperature of refrigerant at the evaporator coil outlet 124 close to the liquid-to-vapor transition temperature (such as within 2 degrees Fahrenheit, for example), as explained below.

Figure 12:
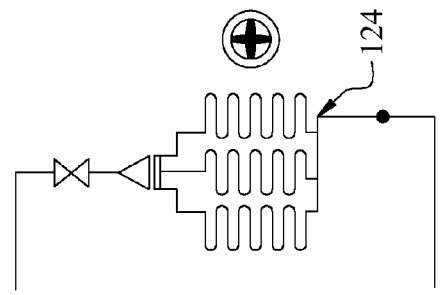
FIG. 12 is an illustration of the flow of refrigerant in the first embodiment where the oscillations in the temperature of the refrigerant falls to the liquid-to-vapor transition temperature for a duration of time, in accordance with the present disclosure.
Figure 14:
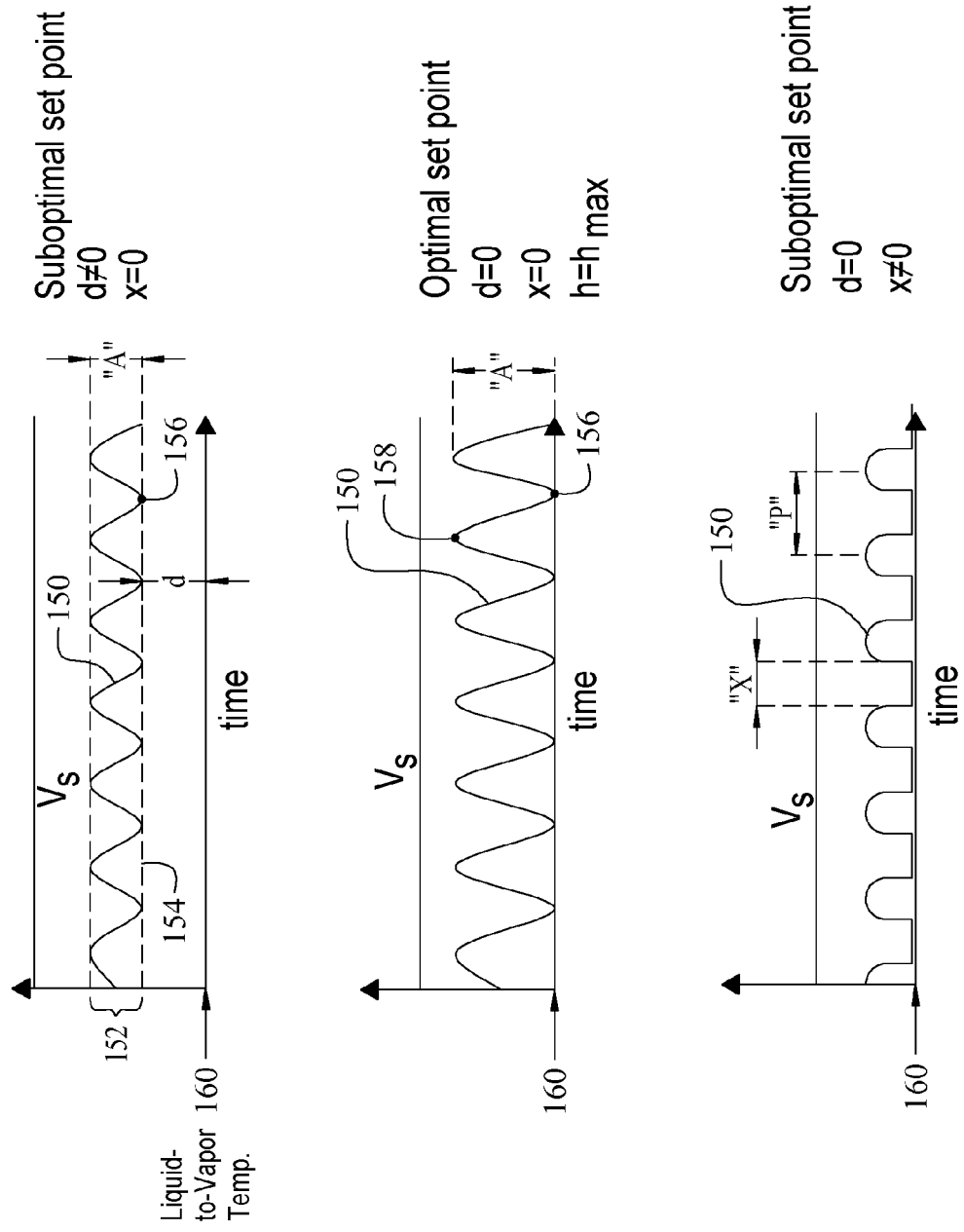
FIG. 14 is a graph illustrating the oscillations in the sensed temperature of the refrigerant at the evaporator coil outlet, in relation to the liquid-to-vapor transition temperature, in accordance with the present disclosure.

The controller 140 is further configured to detect the temperature sensed by the outlet temperature sensor 132 over time, to thereby capture oscillations in the sensed temperature of the refrigerant 108 that define a minimum sensed temperature 156 and a maximum sensed temperature 158 of the refrigerant at the evaporator coil outlet 124, and an amplitude "A" of the oscillations, as shown in FIG. 11. Referring to FIG. 14, the controller determines a difference "d" between a liquid-to-vapor transition temperature 160 of the refrigerant and the minimum sensed temperature 156 (or lower bound 154 of temperature band 152) of the refrigerant 108 at the evaporator coil outlet (shown in FIG. 1 as 124). The controller 140 in FIG. 1 is configured to determine an optimum control set point for controlling the valve's opening area 116 (shown in FIG. 6), based in part on the difference "d" between the liquid-to-vapor transition temperature 160 and the minimum sensed temperature 156 of the refrigerant at the evaporator coil outlet (or lower bound 154 of temperature band 152), as shown in FIG. 14. The optimum control set point is used to determine an optimum opening area that is sufficient to establish a flow rate of refrigerant that maintains the minimum sensed temperature 156 of the refrigerant at the evaporator coil outlet 124 within a fraction of the oscillation amplitude "A" from the liquid-to-vapor transition temperature 160 of the refrigerant as shown in FIG. 11. The controller thereby establishes an optimum opening area such that the minimum sensed temperature 156 is substantially at the liquid-to-vapor transition temperature 160 and the vapor-transition point is substantially at the evaporator coil outlet 124, as shown in FIG. 11. Where a determined control set point results in an oscillating temperature of refrigerant that falls to the liquid-to-vapor transition temperature 160 of the refrigerant for a dwell period "x" as shown in FIG. 12, the controller is further configured to determine an optimum set point to address this situation (where liquid-to-vapor transition occurs beyond evaporator coil outlet). The determination of the optimum control set point for controlling the valve's opening area 116 is also based in part on the duration of time "x" in which the oscillating temperature 150 of the refrigerant at the evaporator coil outlet 124 falls to the liquid-to-vapor transition temperature 160 of the refrigerant, as shown in FIG. 12. The optimum control set point determined based on this duration of time "x" is used to determine an optimum valve opening area sufficient to establish a flow rate of refrigerant that maintains the minimum sensed temperature 156 of the refrigerant at the evaporator coil outlet 124 within a fraction of the oscillation amplitude "A" from the liquid-to-vapor transition temperature 160 of the refrigerant, such that the minimum sensed temperature 156 is substantially at the liquid-to-vapor transition temperature 160, and the vapor transition point is substantially at the evaporator coil outlet 124, as shown in FIG. 12.

Figure 13:
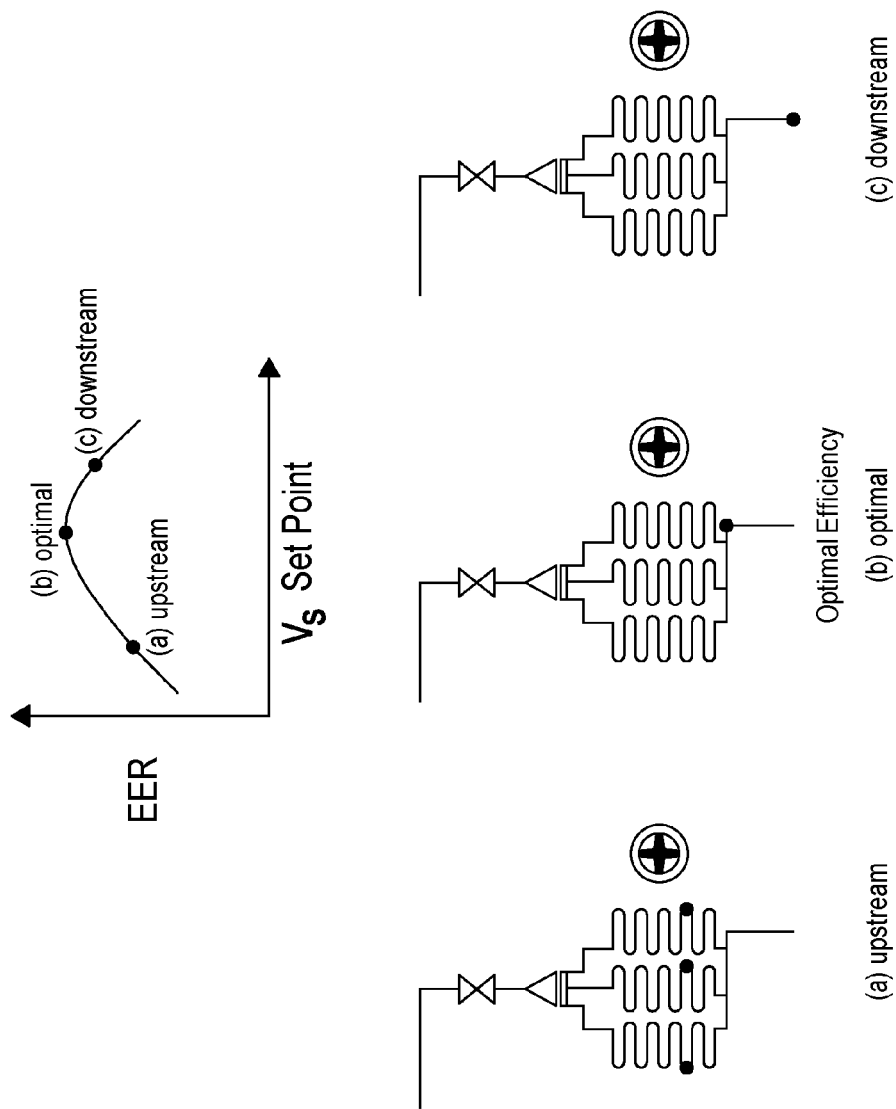
FIG. 13 is a graph of the evaporator efficiency relative to the control set points that establish a liquid-to-vapor transition point at various evaporator locations.

Accordingly, after determining an initial control set point for establishing an initial opening area, the controller 140 in FIG. 1 is configured to determine an optimum opening area for establishing a refrigerant flow rate that maintains the oscillating temperature 150 of refrigerant at the evaporator coil outlet 124 at an optimum range in which the minimum sensed temperature 156 of the refrigerant at the evaporator coil outlet 124 is within a fraction of the oscillation amplitude "A" from the liquid-to-vapor transition temperature 160, and the oscillating temperature 150 of the refrigerant at the evaporator coil outlet 124 does not fall to the liquid-to-vapor transition temperature 160 for more than a time duration of one quarter of the period of the temperature oscillation (see FIGS. 12 and 14). The improved evaporator efficiency resulting from this refrigerant flow control is illustrated in FIG. 13, which shows a graph of the evaporator efficiency relative to the control set points that establish a liquid-to-vapor transition point at various evaporator locations.

Figure 15:
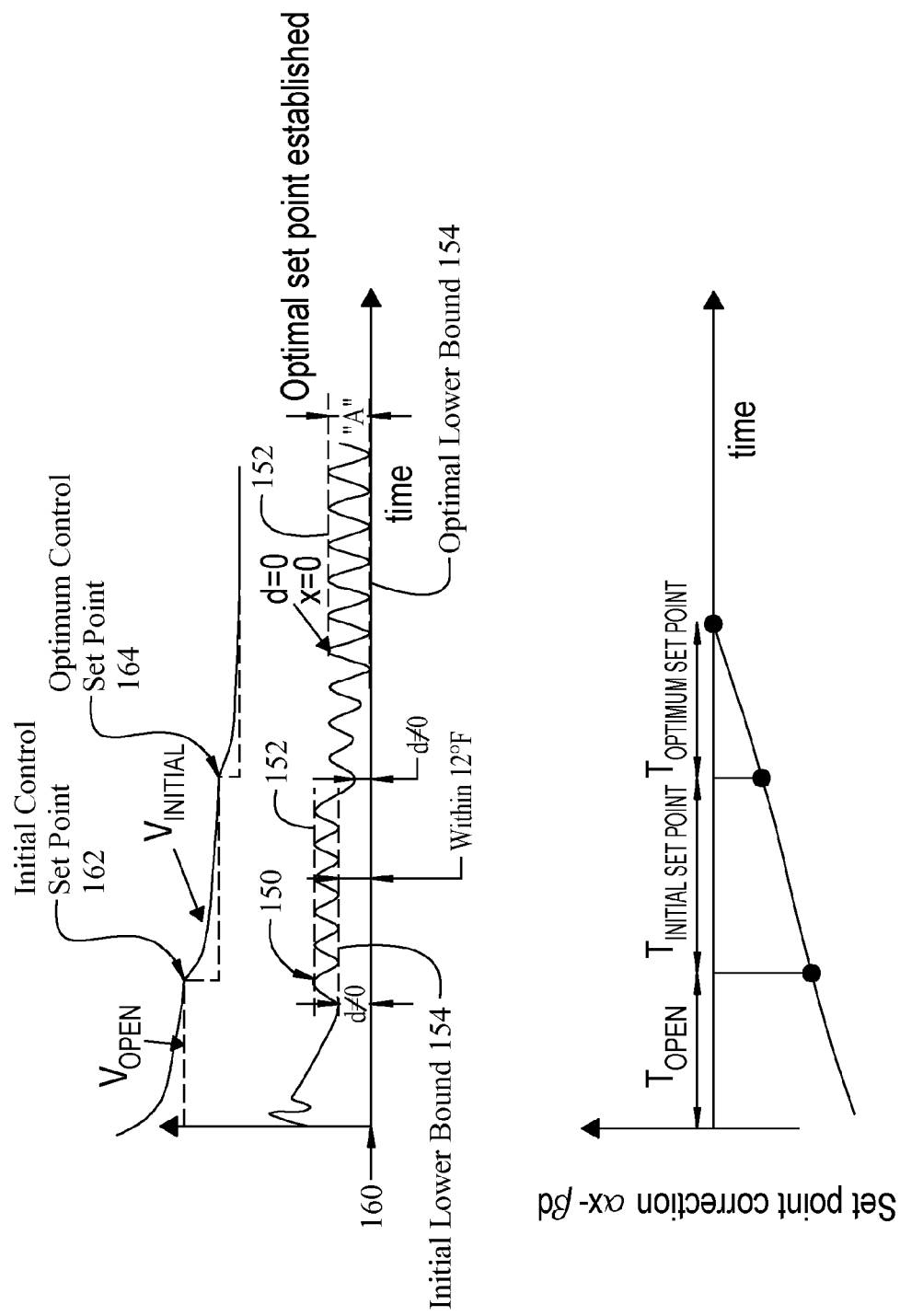
FIG. 15 is a graph showing the evolution of the control of the expansion valve opening area established by the control system of the first embodiment, in accordance with the present disclosure.

Referring to FIG. 15, a graph is shown of the evolution of the control of the expansion valve opening area by the controller 140 of FIG. 1. The expansion valve is first opened to establish refrigerant flow and reach a stabilization, after which the controller determines an initial control set point 162 based on the temperature sensed by the outlet temperature sensor (shown in FIG. 1 as 132), which establishes an initial valve opening area sufficient to regulate the flow rate of refrigerant such that the temperature of the refrigerant at the evaporator coil outlet is within a temperature band 152 having a lower bound 154 within 12 degrees Fahrenheit of the liquid-to-vapor transition temperature 160. Based on the oscillations in temperature of the refrigerant relative to the liquid-to-vapor transition temperature 160, the controller is configured to determine an optimum control set point 164. The controller 140 may be configured to determine an optimum control set point 164 by using a look-up table that includes a number of optimum control set points corresponding to the difference between the liquid-to-vapor transition temperature 160 and the minimum sensed temperature 156 (see difference "d" below oscillating temperature 150 in FIG. 14). As shown in FIG. 14, the difference "d" between the liquid-to-vapor transition temperature 160 and the minimum sensed temperature 156 within the temperature oscillations 150 is an offset value. The controller may be further configured to select from the look-up table an optimum control variable for establishing the optimum opening area that corresponds to a determined optimum control set point, which control variable is used for controlling the flow rate of refrigerant through the expansion valve (shown in FIG. 1 as 110). The optimum opening area establishes a flow rate of refrigerant that maintains the minimum sensed temperature 156 of the refrigerant at the evaporator coil outlet within a fraction of the oscillation amplitude "A" from the liquid-to-vapor transition temperature 160 of the refrigerant, such that the minimum sensed temperature 156 is substantially at the liquid-to-vapor transition temperature 160 (as shown in FIGS. 11 and 15) and the vapor-transition point is substantially at the evaporator coil outlet 124 (as shown in FIG. 11).

Figure 16:
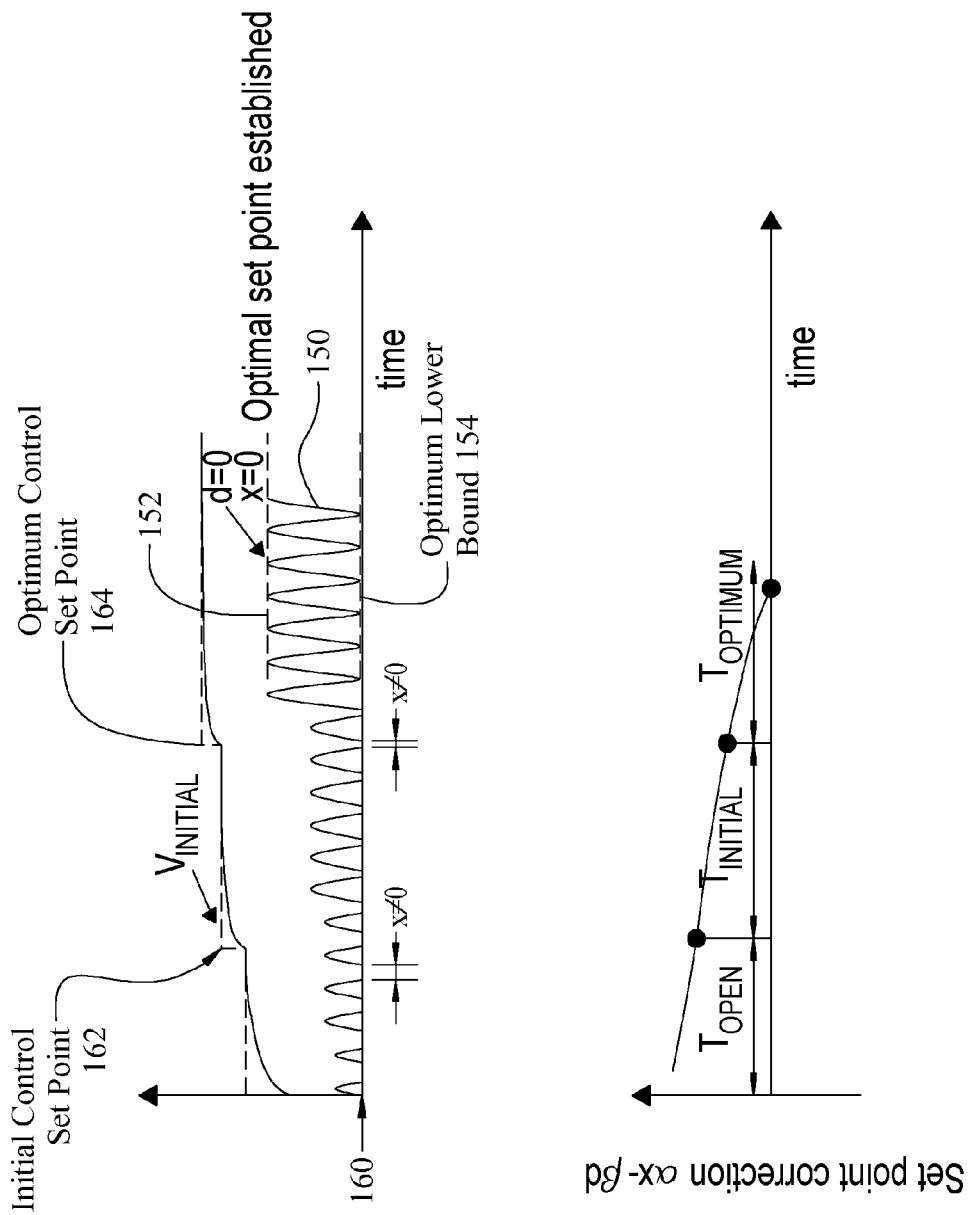
FIG. 16 is a graph showing the evolution of the control of the expansion valve opening area, where the oscillating temperature 150 falls to a liquid-to-vapor transition point 160.

Referring to FIG. 16, a graph is shown of the evolution of the control of the expansion valve opening area by the controller where the oscillating temperature 150 falls to the liquid-to-vapor transition point 160. Based on the oscillations in temperature of the refrigerant relative to the liquid-to-vapor transition temperature 160, the controller 140 is configured to determine an optimum control set point 164 that will bring the oscillating temperature 150 of the refrigerant near to and just above the liquid-to-vapor transition temperature 160. The controller 140 may be configured to determine an optimum control set point 164 by using a look-up table that includes a number of optimum control set points corresponding to the duration of time in which the oscillating temperature 150 of the refrigerant 108 falls to the liquid-to-vapor transition temperature 160 (see duration "x" below oscillating temperature 150 in FIG. 12. As shown in FIGS. 12 and 14, the time duration "t" that the oscillating temperature 150 of the refrigerant 108 at the evaporator coil outlet 124 falls below the liquid-to-vapor transition temperature 160 of the refrigerant is a dwell time value. The controller may be further be configured to select from the look-up table an optimum control variable for establishing the optimum opening area that corresponds to the determined optimum control set point, which control variable is used for controlling the flow rate of refrigerant through the expansion valve (shown in FIG. 1 as 110). The optimum opening area establishes a flow rate of refrigerant that maintains the minimum sensed temperature 156 of the refrigerant 108 at the evaporator coil outlet 124 within a fraction of the oscillation amplitude "A" from the liquid-to-vapor transition temperature 160 of the refrigerant, such that the minimum sensed temperature 156 is substantially at the liquid-to-vapor transition temperature 160 (as shown in FIGS. 11 and 16), and the vapor-transition point is substantially at the evaporator coil outlet 124 (as shown in FIG. 11).

Figure 17:
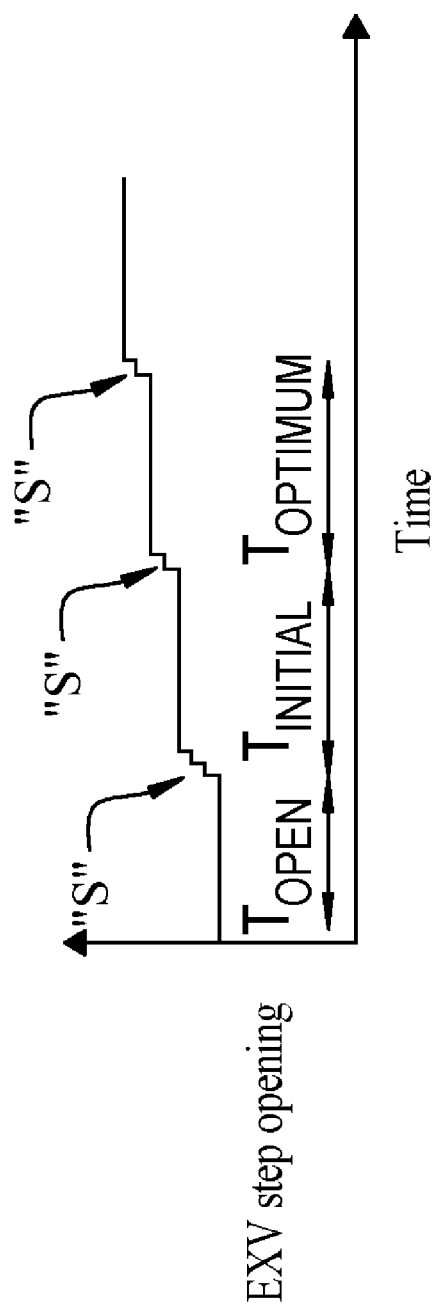
FIG. 17 is a graph illustrating how the control system is configured to determine a number of steps for a stepper motor that is configured to step the valve element to the optimum opening area, in accordance with the present disclosure.

As stated above, the controller 140 in FIG. 1 may be further be configured to select from the look-up table an optimum control variable for establishing the optimum valve opening area (shown in FIG. 6 as 116) that corresponds to the determined optimum control set point, which control variable is used for controlling the flow rate of refrigerant through the expansion valve (shown in FIG. 1 as 110). For example, the controller may be configured to look up a number of steps "S" associated with a stepper motor that is configured to step the valve element to the optimum valve opening area, as shown in FIG. 17. Alternatively, the controller may be configured to look up a current value for operating a solenoid operated needle valve, to displace the valve element (shown in FIG. 6 as 114) to the desired position for maintaining the liquid-to-vapor transition point of the refrigerant flowing through the evaporator coil substantially at the evaporator coil outlet.

Accordingly, unlike conventional air conditioning systems in which the refrigerant's liquid-to-vapor transition point occurs at an intermediate point in the evaporator, the present control system 130 in FIG. 1 is configured to establish an optimum flow rate of refrigerant 108 such that the liquid-to-vapor transition point of the refrigerant 108 flowing through the evaporator coil 120 is substantially at the evaporator coil outlet 124. Additionally, the present control system 130 results in a lower degree of superheat, which improves the efficiency of the air conditioning refrigeration cycle. The present control system also controls refrigerant flow and superheat based on the signature of the refrigerant temperature, unlike conventional air conditioning systems in which the superheat is estimated or controlled based on temperature, as shown in FIG. 18. As shown in FIG. 18, conventional air conditioning systems assume that the pressure drop across the evaporator is zero (or constant pressure as shown in FIG. 18), and accordingly estimate superheat using the difference between refrigerant temperature at the evaporator inlet and outlet However, as shown in FIG. 19, evaporators can exhibit significant pressure drop, which can lead to error in estimating and controlling superheat and cause control performance problems in such conventional systems The present control system avoids this problem by controlling refrigerant flow and superheat based on the temperature oscillations of the refrigerant relative to the refrigerant's liquid-to-vapor transition temperature, to maintain the refrigerant's liquid-to-vapor transition point substantially at the evaporator coil outlet 124. The control system 130 accomplishes this improvement by establishing an optimum flow rate of refrigerant 108 through the expansion valve 110, based on the difference between the minimum sensed temperature 156 and liquid-to-vapor transition temperature 160, and the duration of time in which the refrigerant's oscillating temperature 150 falls to the liquid-to-vapor transition temperature 160.

Figure 20:
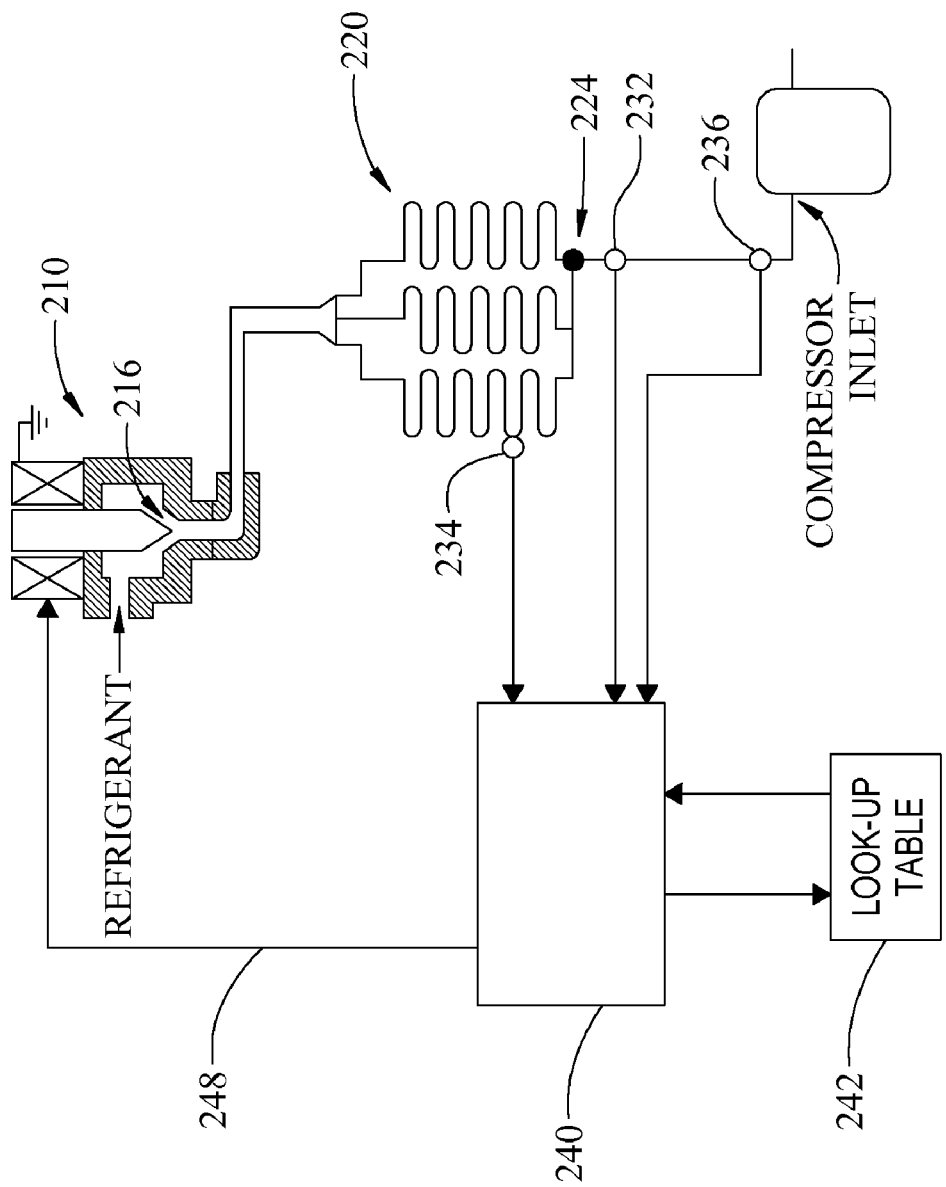
FIG. 20 is a diagram of a first embodiment of a controller for controlling an expansion valve for regulating refrigerant flow to an evaporator coil of an air conditioning system.

According to another aspect of the present disclosure, an exemplary embodiment is shown in FIG. 20 of a controller 240 for controlling an opening area 216 in an expansion valve 210 to regulate refrigerant flow to an evaporator coil 220. The controller 240 is in communication with an outlet temperature sensor 232 that is configured to sense the temperature of refrigerant near the evaporator coil outlet 224, where the temperature of the refrigerant at the evaporator coil outlet is dependent on the flow rate of refrigerant to the evaporator coil 220. The controller 240 is also in communication with an expansion valve 210, and is configured to provide an output at 248 of a control variable to the expansion valve for adjusting the opening area in the expansion valve. Specifically, the controller 240 is configured to determine a control set point, where the control set point to be determined and established may be a desired difference between the temperature of the refrigerant entering the compressor suction line 236 (where the refrigerant temperature is more stable), and the temperature of refrigerant in the evaporator coil 220 sensed by evaporator coil temperature sensor 234. The controller 240 is configured to determine an initial control set point based on the temperature sensed by the evaporator coil outlet temperature sensor 232, which initial control set point is used to determine a first valve opening area sufficient to regulate the flow rate of refrigerant such that the temperature sensed by the outlet temperature sensor 232 (e.g., the temperature of refrigerant at the outlet of the evaporator) is within a temperature band having a lower bound that is within 12 degrees Fahrenheit above the liquid-to-vapor transition temperature of the refrigerant (see FIG. 10). The controller 240 is further configured to determine a control variable for establishing an initial opening area corresponding to the initial control setpoint, and to output the control variable to the expansion valve to establish the initial flow rate of refrigerant through the expansion valve 210.

The controller 240 is further configured to detect the temperature sensed by the evaporator coil outlet temperature sensor 232 over time, to thereby capture oscillations in the sensed temperature of the refrigerant which define a minimum and maximum sensed temperature of the refrigerant at the evaporator coil outlet 224, and an amplitude "A" of the temperature oscillations (see FIG. 14). The controller 240 is further configured to determine an optimum control set point, based on a difference between a liquid-to-vapor transition temperature and the minimum sensed temperature of the refrigerant, or based on a duration of time in which the oscillating temperature of the refrigerant at the evaporator coil outlet 224 of the evaporator coil falls to the liquid-to-vapor transition temperature of the refrigerant. The controller 240 is further configured to determine a control variable for establishing the optimum opening area that corresponds to the determined optimum control set point, and to output the control variable to the expansion valve 210 to thereby establish the optimum flow rate of refrigerant that maintains the oscillating temperature of the refrigerant at an optimum level in which the minimum sensed temperature of the refrigerant at the evaporator coil outlet 224 within a fraction of the oscillation amplitude "A" from the liquid-to-vapor transition temperature, and the oscillating temperature of the refrigerant at the evaporator coil outlet 224 does not fall below the liquid-to-vapor transition temperature for more than a time duration of one quarter of the period "P" of the temperature oscillation. In the above determination of an optimum opening area 216, the difference between the liquid-to-vapor transition temperature and the minimum sensed temperature within the oscillations is an offset value, and the time duration that the oscillating temperature of the refrigerant at the evaporator coil outlet 224 of the evaporator coil falls below the liquid-to-vapor transition temperature of the refrigerant is an offset value. The controller 240 may further include a look-up table 242, wherein the controller 240 is configured to select from the look-up table 242 a control variable for establishing the optimum valve opening area 216 corresponding to the optimum control set point, for controlling the flow rate of refrigerant through the expansion valve 210.

In an alternate construction of the embodiment shown in FIG. 20, the controller 240 may further comprise at least one other evaporator coil temperature sensor 234 upstream of the outlet temperature sensor 232 that is configured to sense temperature of refrigerant within the evaporator at a point upstream of the outlet temperature sensor 232, wherein the controller 240 is configured to determine a temperature difference between the temperature sensed by the at least one other evaporator coil temperature sensor 234 and the temperature sensed by the evaporator coil outlet temperature sensor 232 over time. The controller 240 preferably is configured to determine a temperature difference over time (between the at least one other evaporator coil temperature sensor and the evaporator coil outlet temperature sensor) to capture oscillations in the temperature of the refrigerant at the evaporator coil outlet 224. The controller 240 may be further configured to determine a control set point based on the temperature difference a second optimum opening area 216 for establishing a flow rate of refrigerant that maintains the oscillating temperature of the refrigerant at the evaporator coil outlet 224 at an optimal range, such that the minimum sensed temperature of the refrigerant at the evaporator coil outlet 224 is within a fraction of the oscillation amplitude (see "A" in FIG. 14) from the liquid-to-vapor transition temperature, and the oscillating temperature of the refrigerant at the evaporator coil outlet does not fall to the liquid-to-vapor transition temperature for more than a time duration of one quarter of the period (see "P" in FIG. 14) of the temperature oscillation frequency.

Figure 21:
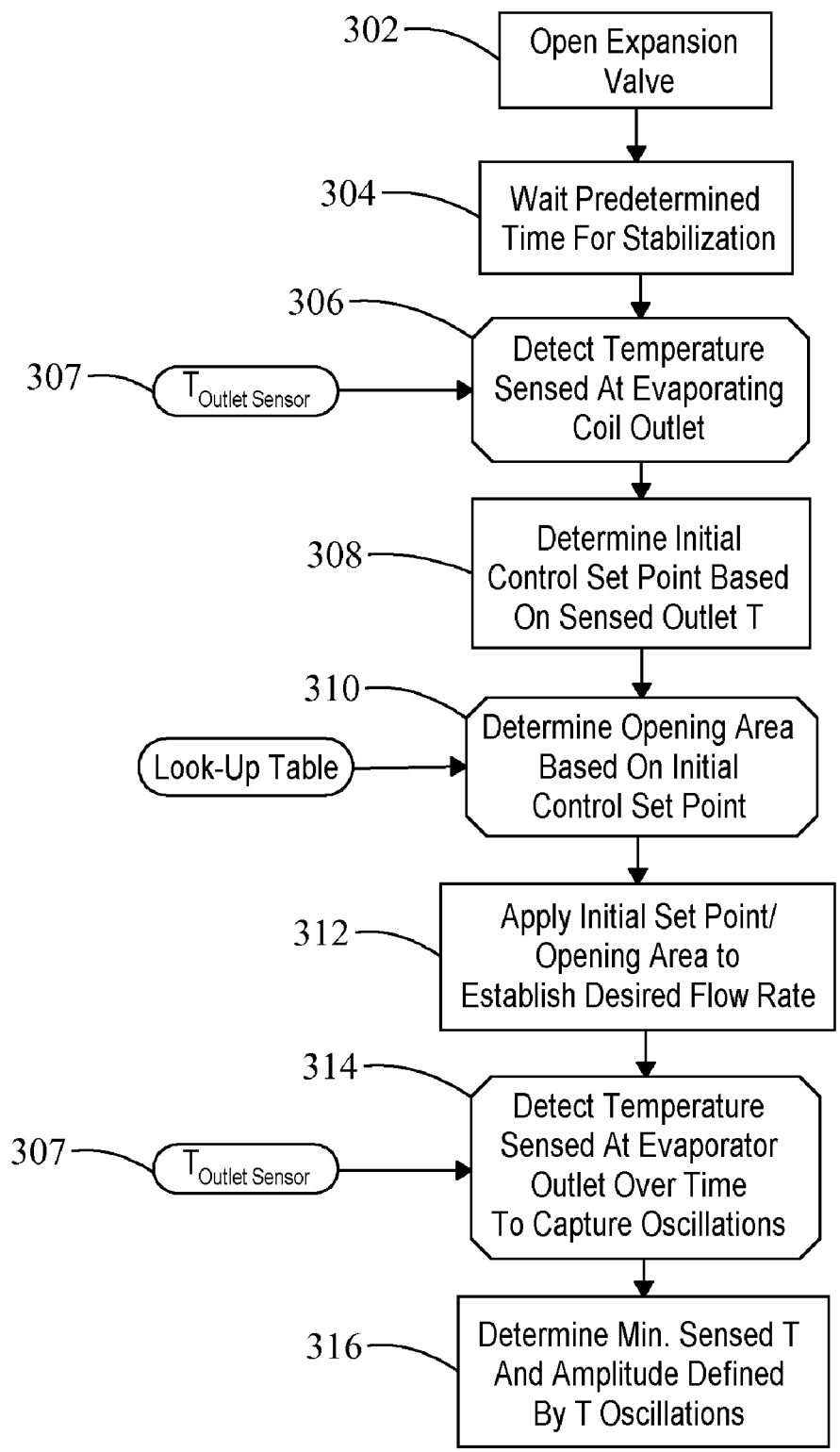
FIG. 21 is a flow chart of one embodiment of a method for controlling an opening area in an expansion valve to regulate a flow rate of refrigerant therethrough to an evaporator coil.

In another aspect of the various embodiments, a method is provided for controlling an opening area in an expansion valve to regulate a flow rate of refrigerant therethrough to an evaporator coil, as shown in FIG. 21. The method includes opening the expansion valve to establish refrigerant flow to the evaporator at step 302, and waiting a predetermined time sufficient to permit stabilization of refrigerant flow at step 304. The method further includes detecting the temperature sensed by at least the evaporator coil outlet temperature sensor at step 306 (via sensor input at 307), and determining an initial control set point based on the temperature sensed by the evaporator coil outlet temperature sensor at step 308. The method continues at step 310 by determining, based on the initial control set point, a first valve opening area that is sufficient to regulate the flow rate of refrigerant, such that the temperature of the refrigerant at the outlet of the evaporator is within a temperature band having a lower bound that is within 7 degrees Fahrenheit above the liquid-to-vapor transition temperature of the refrigerant. The method includes applying the initial control set point at step 312, to cause the expansion valve to establish the desired refrigerant flow rate. The method then detects the temperature sensed by the evaporator coil outlet temperature sensor over time, to thereby capture oscillations in the sensed temperature of the refrigerant at step 314, which define a minimum and maximum sensed temperature of the refrigerant at the evaporator coil outlet.

Figure 22:
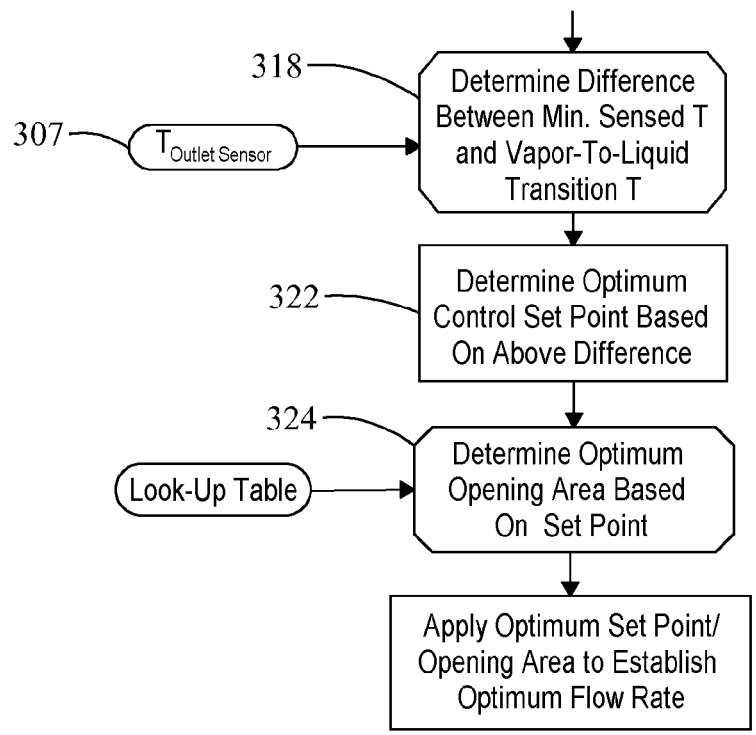
FIG. 22 is a flow chart of one embodiment of a determination of an optimum setting for the method in FIG. 22.

The method may continue as shown in FIG. 22, by determining a difference between the liquid-to-vapor transition temperature and the minimum sensed temperature of the refrigerant at the evaporator coil outlet, if any, at step 316. The method proceeds to determine an optimum control set point at step 318, based on the difference between the liquid-to-vapor transition temperature and said minimum sensed temperature of the refrigerant at the evaporator coil outlet, if any. Lastly, the method concludes at step 322 by determining, based on the optimum control set point, a second optimum valve opening area for establishing a flow rate of refrigerant that maintains the oscillating temperature of the refrigerant at an optimum level in which the minimum sensed temperature of the refrigerant at the evaporator coil outlet within a fraction of the oscillation amplitude "A" from the liquid-to-vapor transition.

Figure 23:
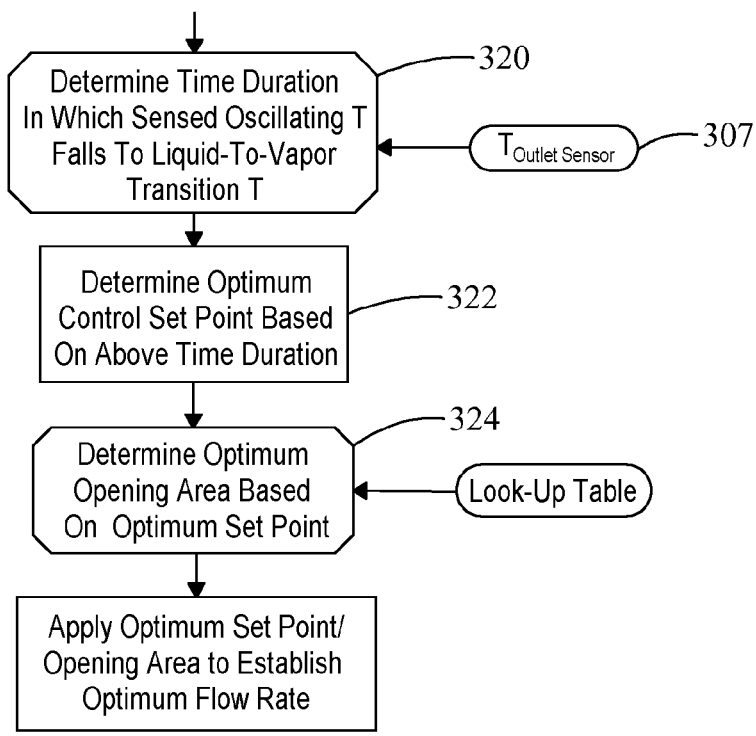
FIG. 23 is a flow chart of one embodiment of a determination of an optimum setting for the method in FIG. 22.
Figure 24:
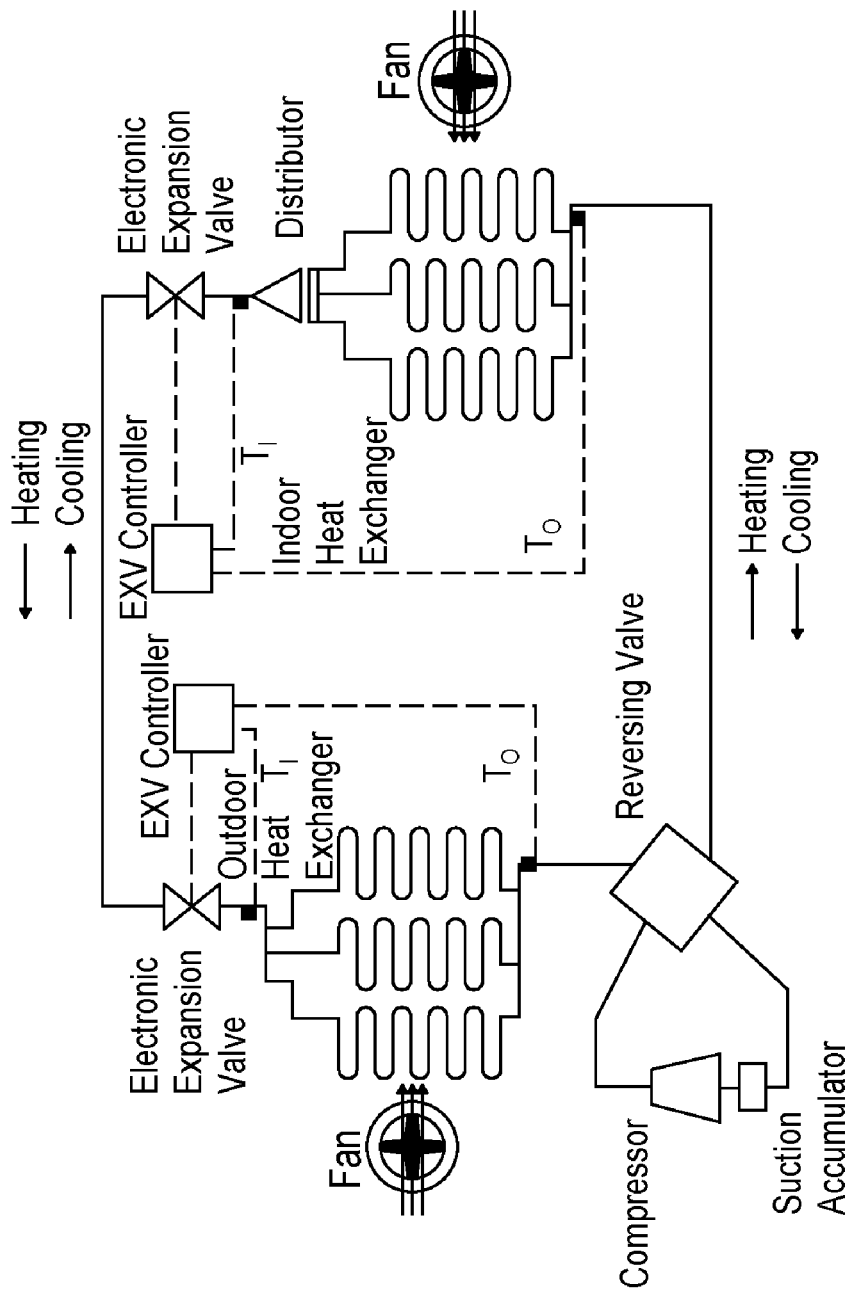
FIG. 24 is a diagram of an air conditioner and a heat pump.

Similarly, the method may continue as shown in FIG. 23, by determining a duration of time in which the oscillating temperature of the refrigerant at the outlet of the evaporator coil falls to the liquid-to-vapor transition temperature of the refrigerant, if any, at step 320. The method proceeds to determine an optimum control set point at step 322, based on the duration in which the oscillating temperature of the refrigerant at the outlet of the evaporator coil falls to the liquid-to-vapor transition temperature of the refrigerant, if any. Lastly, the method concludes at step 324 by determining, based on the optimum control set point, a second optimum valve opening area for establishing a flow rate of refrigerant that maintains the oscillating temperature of the refrigerant at an optimum level in which the minimum sensed temperature of the refrigerant at the evaporator coil outlet within a fraction of the oscillation amplitude "A" from the liquid-to-vapor transition, and the oscillating temperature of the refrigerant at the evaporator coil outlet does not fall to the liquid-to-vapor transition temperature for more than a time duration of one quarter of the period of the temperature oscillation frequency.

Accordingly, the description of the various embodiments above is merely exemplary in nature and, thus, variations that do not depart from the gist of the invention are intended to be within the scope of the invention. Additional design considerations, such as a stepper motor or modulating coil for the valve, may be incorporated, and such variations are not to be regarded as a departure from the spirit and scope of the invention. Accordingly, it is not intended that the invention be limited by the particular embodiment or form described above, but by the appended claims.

Terms such as "upper," "lower," "inner," "outer," "vertically," "horizontally," "inwardly," "outwardly," and the like when used herein refer to positions of the respective elements as they are shown in the accompanying drawings, and the disclosure is not necessarily limited to such positions.

The foregoing description of the embodiments of the present invention has been provided for purposes of illustration and description. It is not intended to be exhaustive or to limit the invention to the precise forms disclosed. Individual features of a particular embodiment are generally not limited to that particular embodiment, but, where applicable, are interchangeable and can be used in a selected embodiment, even if not specifically shown or described.

What is claimed is:

1. A control system for an expansion valve and an evaporator of an air conditioning system, comprising:

an evaporator coil having an inlet and an outlet, the evaporator being configured to conduct heat to a refrigerant flowing through the evaporator coil, wherein the temperature of the refrigerant exiting the evaporator coil outlet is dependent on the flow rate of the refrigerant to the evaporator coil;

a valve having a valve element that is movable relative to a valve port for varying an opening area of the valve port to regulate the flow of refrigerant through the valve and to the evaporator coil;

an evaporator coil outlet temperature sensor configured to sense the temperature of refrigerant within the evaporator coil near the outlet of the evaporator coil;

at least one other evaporator coil temperature sensor upstream of the outlet temperature sensor, which is configured to sense temperature of refrigerant within the evaporator coil at a point upstream of the outlet temperature sensor;

a controller in communication with the evaporator coil outlet temperature sensor, the controller being configured to determine a control set point based on the sensed temperature of refrigerant near the outlet of the evaporator coil, which control set point is used to determine a valve opening area sufficient to regulate the flow rate of refrigerant into the evaporator coil such that the temperature of the refrigerant at the outlet of the evaporator coil is within a temperature band having a lower bound that is within 12 degrees Fahrenheit above the liquid-to-vapor transition temperature of the refrigerant;

wherein the controller is configured to determine a temperature difference over time, between the temperature sensed by the at least one other evaporator coil temperature sensor and the evaporator coil outlet temperature sensor, to capture oscillations in the sensed temperature of the refrigerant at the evaporator coil outlet, which define a minimum and maximum sensed temperature within the oscillations and an amplitude "A" of the oscillations in the sensed temperature; and wherein the controller is configured to determine, based on the temperature difference over time between the at least one other evaporator coil temperature sensor and the evaporator coil outlet temperature sensor, an optimum control set point used to determine an optimum opening area for establishing a flow rate of refrigerant that maintains the oscillating temperature of the refrigerant at an optimal range in which the minimum sensed temperature of the refrigerant at the evaporator coil outlet is within a fraction of the oscillation amplitude "A" from the liquid-to-vapor transition temperature, and the oscillating temperature of the refrigerant at the evaporator coil outlet does not fall to the liquid-to-vapor transition temperature for more than a time duration of one-quarter of the period of the oscillations in the temperature of the refrigerant at the evaporator coil outlet.

2. The control system of claim 1, wherein the control set point that is determined by the controller based on the temperature sensed by the evaporator coil outlet temperature sensor is an initial control set point, which is used to determine an initial valve opening area that is sufficient to regulate the flow rate of refrigerant such that the temperature of the refrigerant at the evaporator coil outlet is within a temperature band having a lower bound that is within 12 degrees Fahrenheit above the liquid-to-vapor transition temperature of the refrigerant.

3. The control system of claim 2, wherein the controller is further configured to detect the temperature sensed by the evaporator coil outlet temperature sensor over time, to thereby capture oscillations in the sensed temperature of the refrigerant that define a minimum sensed temperature and a maximum sensed temperature of the refrigerant at the evaporator coil outlet, and an amplitude "A" of the oscillations in the sensed temperature.

4. The control system of claim 1, wherein the controller is configured to control the temperature of refrigerant exiting the evaporator coil outlet by determining a control set point used to control the valve's opening area for regulating the flow rate of refrigerant through the expansion valve and to the evaporator coil.

5. The control system of claim 4, wherein the controller establishes an optimum flow rate of refrigerant through the expansion valve to maintain oscillations in the sensed temperature of refrigerant at the evaporator coil outlet within a fraction of the oscillation amplitude "A" from the liquid-to-vapor transition temperature.

6. A control system for an expansion valve and an evaporator of an air conditioning system, comprising:

an evaporator coil having an inlet and an outlet, the evaporator being configured to conduct heat to a refrigerant flowing through the evaporator coil, wherein the temperature of the refrigerant exiting the evaporator coil outlet is dependent on the flow rate of the refrigerant to the evaporator coil;

a valve having a valve element that is movable relative to a valve port for varying an opening area of the valve port to regulate the flow of refrigerant through the valve and to the evaporator coil;

an evaporator coil outlet temperature sensor configured to sense the temperature of refrigerant within the evaporator coil near the outlet of the evaporator coil; and a controller in communication with the evaporator coil outlet temperature sensor, the controller being configured to determine a control set point based on the sensed temperature of refrigerant near the outlet of the evaporator coil, which control set point is used to determine a valve opening area sufficient to regulate the flow rate of refrigerant into the evaporator coil such that the temperature of the refrigerant at the outlet of the evaporator coil is within a temperature band having a lower bound that is within 12 degrees Fahrenheit above the liquid-to-vapor transition temperature of the refrigerant;

wherein the control set point that is determined by the controller based on the temperature sensed by the evaporator coil outlet temperature sensor is an initial control set point, which is used to determine an initial valve opening area that is sufficient to regulate the flow rate of refrigerant such that the temperature of the refrigerant at the evaporator coil outlet is within a temperature band having a lower bound that is within 12 degrees Fahrenheit above the liquid-to-vapor transition temperature of the refrigerant;

wherein the controller is further configured to detect the temperature sensed by the evaporator coil outlet temperature sensor over time, to thereby capture oscillations in the sensed temperature of the refrigerant that define a minimum sensed temperature and a maximum sensed temperature of the refrigerant at the evaporator coil outlet, and an amplitude "A" of the oscillations in the sensed temperature; and wherein the controller is further configured to determine an optimum control set point for controlling the valve's opening area, based in part on a difference between the liquid-to-vapor transition temperature and said minimum sensed temperature of the refrigerant at the evaporator coil outlet, wherein the optimum control set point is used to determine an optimum opening area sufficient to establish a flow rate of refrigerant that maintains the minimum sensed temperature of the refrigerant at the evaporator coil outlet within a fraction of the oscillation amplitude "A" from the liquid-to-vapor transition temperature of the refrigerant.

7. The control system of claim 6, wherein the controller is further configured to determine an optimum control set point for controlling the valve's opening area, based in part on a duration of time in which the oscillating temperature of the refrigerant at the evaporator coil outlet falls to the liquid-to-vapor transition temperature of the refrigerant, wherein the optimum control set point is used to determine an optimum opening area sufficient to establish a flow rate of refrigerant that maintains the minimum sensed temperature of the refrigerant at the evaporator coil outlet within a fraction of the oscillation amplitude "A" from the liquid-to-vapor transition temperature of the refrigerant.

8. The control system of claim 7, wherein the controller is configured to determine an optimum opening area for establishing a flow rate of refrigerant that maintains the oscillating temperature of the refrigerant at the evaporator coil outlet at an optimum range in which the minimum sensed temperature of the refrigerant at the evaporator coil outlet is within a fraction of the oscillation amplitude "A" from the liquid-to-vapor transition temperature, and the oscillating temperature of the refrigerant at the evaporator coil outlet does not fall to the liquid-to-vapor transition temperature for more than a time duration of one-quarter of the period of the oscillations in the sensed temperature.

9. The control system of claim 8 further comprising a look-up table of the controller, wherein the controller is configured to select from the look-up table a control variable for establishing the determined optimum opening area that corresponds to the determined optimum control set point, for controlling the flow rate of refrigerant through the expansion valve.

10. The control system of claim 7, wherein the fraction of the oscillation amplitude "A" of the sensed temperature is three-quarters of the amplitude "A".

11. The control system of claim 7, wherein the fraction of the oscillation amplitude "A" of the sensed temperature is one-half of the amplitude "A".

12. The control system of claim 11 further comprising a look-up table of the controller, wherein the controller is configured to select from the look-up table a control variable for establishing a particular valve opening area that corresponds to the control set point, where the controller applies the control variable to the expansion valve to establish the particular valve opening area for establishing an optimum flow rate of refrigerant through the expansion valve.

13. The control system of claim 6, further comprising at least one other evaporator coil temperature sensor upstream of the outlet temperature sensor, which is configured to sense temperature of refrigerant within the evaporator coil at a point upstream of the outlet temperature sensor.

14. The control system of claim 13, wherein the controller is configured to determine a temperature difference over time, between the temperature sensed by the at least one other evaporator coil temperature sensor and the evaporator coil outlet temperature sensor, to capture oscillations in the temperature of the refrigerant at the evaporator coil outlet, which define a minimum and maximum sensed temperature within the oscillations and an amplitude "A" of the oscillations in the temperature.

15. The control system of claim 14, wherein the controller is configured to determine, based on the temperature difference over time between the at least one other evaporator coil temperature sensor and the evaporator coil outlet temperature sensor, an optimum control set point used to determine an optimum opening area for establishing a flow rate of refrigerant that maintains the oscillating temperature of the refrigerant at an optimal range in which the minimum sensed temperature of the refrigerant at the evaporator coil outlet is within a fraction of the oscillation amplitude "A" from the liquid-to-vapor transition temperature, and the oscillating temperature of the refrigerant at the evaporator coil outlet does not fall to the liquid-to-vapor transition temperature for more than a time duration of one-quarter of the period of the oscillations in the temperature of the refrigerant at the evaporator coil outlet.

16. A control system for controlling an opening area in an expansion valve to regulate a flow rate of refrigerant therethrough to an evaporator coil having an outlet temperature sensor for sensing the temperature of refrigerant near an evaporator coil outlet, where the temperature of the refrigerant at the evaporator coil outlet is dependent on the flow rate of refrigerant to the evaporator coil, the control system comprising:

a controller in communication with the evaporator coil outlet temperature sensor, the controller being configured to determine an initial control set point based on the temperature sensed by the evaporator coil outlet temperature sensor, which initial control set point is used to determine a first valve opening area sufficient to regulate the flow rate of refrigerant such that the temperature of the refrigerant at the outlet of the evaporator is within a temperature band having a lower bound that is within 12 degrees Fahrenheit above the liquid-to-vapor transition temperature of the refrigerant, said controller being further configured to detect the temperature sensed by the evaporator coil outlet temperature sensor over time, to thereby capture oscillations in the sensed temperature of the refrigerant that define a minimum sensed temperature and maximum sensed temperature of the refrigerant at the evaporator coil outlet, and an amplitude "A" of the oscillations in the sensed temperature, said controller being further configured to determine an optimum control set point, based on a difference between the liquid-to-vapor transition temperature and said minimum sensed temperature of the refrigerant at the evaporator coil outlet, and/or based on a duration of time in which the oscillating temperature of the refrigerant at the outlet of the evaporator coil falls to the liquid-to-vapor transition temperature of the refrigerant, wherein the optimum control set point is used to determine a second optimum valve opening area for establishing a flow rate of refrigerant that maintains the oscillating temperature of the refrigerant at an optimum level in which the minimum sensed temperature of the refrigerant at the evaporator coil outlet within a fraction of the oscillation amplitude "A" from the liquid-to-vapor transition temperature, and the oscillating temperature of the refrigerant at the evaporator coil outlet does not fall to the liquid-to-vapor transition temperature for more than a time duration of one-quarter of the period of the oscillations of the sensed temperature.

17. The control system of claim 16 further comprising a look-up table of the controller, wherein the controller is configured to select from the look-up table a control variable for establishing the second optimum valve opening area that corresponds to the optimum control set point, for controlling the flow rate of refrigerant through the expansion valve to the evaporator coil.

18. The control system of claim 16, wherein the difference between the liquid-to-vapor transition temperature and said minimum sensed temperature within said oscillations is an offset value, and the time duration that the oscillating temperature of the refrigerant at the outlet of the evaporator coil falls to the liquid-to-vapor transition temperature of the refrigerant is a dwell time value.

19. The control system of claim 16, further comprising at least one other evaporator coil temperature sensor upstream of the outlet temperature sensor that is configured to sense temperature of refrigerant within the evaporator at a point upstream of the outlet temperature sensor, wherein the controller is configured to determine a temperature difference between the temperature sensed by the at least one other evaporator coil temperature sensor and the temperature sensed by the evaporator coil outlet temperature sensor over time, and is further configured to determine based on the temperature difference a second optimum opening area for establishing a flow rate of refrigerant that maintains the oscillating temperature of the refrigerant at the evaporator coil outlet at an optimal range in which the minimum sensed temperature of the refrigerant at the evaporator coil outlet within a fraction of the oscillation amplitude "A" from the liquid-to-vapor transition temperature, and the oscillating temperature of the refrigerant at the evaporator coil outlet does not fall to the liquid-to-vapor transition temperature for more than a time duration of one-quarter of the period of the oscillations in the sensed temperature.

20. A method for operating a controller for controlling an opening area in an expansion valve to regulate a flow rate of refrigerant therethrough to an evaporator coil having an outlet temperature sensor for sensing the temperature of refrigerant near an evaporator coil outlet, where the temperature of the refrigerant at the evaporator coil outlet is dependent on the flow rate of the refrigerant to the evaporator coil, the method comprising:

opening the expansion valve to establish refrigerant flow to the evaporator;

waiting a predetermined time sufficient to permit stabilization of refrigerant flow;

detecting the temperature sensed by at least the evaporator coil outlet temperature sensor;

determining an initial control set point based on the temperature sensed by the evaporator coil outlet temperature sensor;

determining, based on the initial control set point, a first valve opening area that is sufficient to regulate the flow rate of refrigerant such that the temperature of the refrigerant at the outlet of the evaporator is within a temperature band having a lower bound that is within 12 degrees Fahrenheit above the liquid-to-vapor transition temperature of the refrigerant;

detecting the temperature sensed by the evaporator coil outlet temperature sensor over time, to thereby capture oscillations in the sensed temperature of the refrigerant that define a minimum sensed temperature and a maximum sensed temperature of the refrigerant at the evaporator coil outlet;

determining a difference between the liquid-to-vapor transition temperature and said minimum sensed temperature of the refrigerant at the evaporator coil outlet, if any;

determining a duration of time in which the oscillating temperature of the refrigerant at the outlet of the evaporator coil falls to the liquid-to-vapor transition temperature of the refrigerant, if any;

determining an optimum control set point, based on the difference between the liquid-to-vapor transition temperature and said minimum sensed temperature of the refrigerant at the evaporator coil outlet, and/or on the duration of time in which the oscillating temperature of the refrigerant at the outlet of the evaporator coil falls to the liquid-to-vapor transition temperature of the refrigerant;

determining, based on the optimum control set point, a second optimum valve opening area for establishing a flow rate of refrigerant that maintains the oscillating temperature of the refrigerant at an optimum level in which the minimum sensed temperature of the refrigerant at the evaporator coil outlet within a fraction of the oscillation amplitude "A" from the liquid-to-vapor transition temperature, and the oscillating temperature of the refrigerant at the evaporator coil outlet does not fall to the liquid-to-vapor transition temperature for more than a time duration of one-quarter of the period of the oscillations in the sensed temperature.

* * * * *